(12) United States Patent
Hirahara

(10) Patent No.: US 7,970,780 B2
(45) Date of Patent: Jun. 28, 2011

(54) JOB LOG MANAGEMENT SYSTEM AND JOB LOG MANAGEMENT METHOD

(75) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 12/136,972

(22) Filed: Jun. 11, 2008

(65) Prior Publication Data

US 2008/0313156 A1    Dec. 18, 2008

(30) Foreign Application Priority Data

Jun. 12, 2007   (JP) .................................. 2007-155596

(51) Int. Cl.
*G06F 17/30*    (2006.01)

(52) U.S. Cl. ....... 707/758; 707/769; 358/1.14; 358/1.15

(58) Field of Classification Search ................. 358/1.14, 358/1.15
See application file for complete search history.

(56) References Cited

U.S. PATENT DOCUMENTS

| | | | | |
|---|---|---|---|---|
| 5,982,994 A | * | 11/1999 | Mori et al. ................... | 358/1.15 |
| 7,051,020 B2 | * | 5/2006 | Dettinger et al. ..................... | 1/1 |
| 7,120,910 B2 | * | 10/2006 | Matsuda et al. .............. | 718/102 |
| 7,546,365 B2 | * | 6/2009 | Torii .............................. | 709/224 |
| 7,573,590 B2 | * | 8/2009 | Hashimoto et al. .......... | 358/1.13 |
| 2007/0121151 A1 | * | 5/2007 | Uchida ........................ | 358/1.15 |

FOREIGN PATENT DOCUMENTS

JP    2004-362015 A    12/2004

* cited by examiner

*Primary Examiner* — Debbie Le

(74) *Attorney, Agent, or Firm* — Canon U.S.A., Inc., IP Division

(57) ABSTRACT

A system including a search unit configured, when a user designates a search condition for the job log whose content to be changed and issues a job log change request, to search the database for a job log that satisfies the search condition, a re-search unit configured, if the search unit does not find the job log satisfying the search condition, to wait until the database managing the job log is updated and perform a re-search for the job log satisfying the search condition, without receiving a re-search instruction from the user, a changing unit configured, when the re-search unit finds the job log satisfying the search condition, to change the job log content according to the change request from the user, and a notification unit configured to send notification information about a change result of the changing unit.

15 Claims, 21 Drawing Sheets

CHARGING DATA CHANGE REQUEST DIALOG

ENTER INFORMATION ABOUT JOB WHOSE INFORMATION IS TO BE CHANGED AS MUCH AS YOU KNOW, DESIGNATE DATA AFTER CHANGE, AND DESIGNATE OPERATION.

CHANGE TARGET JOB INFORMATION

- JOB TYPE: PRINT   DOCUMENT NAME: *INVOICE.DOC
- JOB OWNER NAME: TARO KAKIN
- DEVICE NAME: Laser Printer 1000   DEVICE ADDRESS:
- JOB PERFORMING DATE AND TIME: 2006 YEAR 10 MONTH 21 DATE – APPROXIMATE TIME
  - 1
  - 2
  - 3
  - 4
  - 5
- CHARGING TARGET: BILLING CODE
- CHARGING DATA: 111000-2300-456

CHANGE TARGET DATA

- CHARGING TARGET: BILLING CODE
- CHARGING DATA: 122000-2500-456

OPERATION SETTING

- ○ ALWAYS VERIFY BEFORE APPLYING CHANGE
- ○ VERIFY IF A PLURALITY OF CANDIDATES EXISTS
- ⦿ APPLY CHANGE WITHOUT VERIFICATION REGARDLESS OF NUMBER OF CANDIDATES

[ OK ]   [ CANCEL ]

| CHARGING DATA CHANGE VERIFICATION | | | | | |
|---|---|---|---|---|---|
| A PLURALITY OF CHANGE CANDIDATES HAS BEEN FOUND. SELECT JOB TO BE CHANGED. | | | | | |
| DOCUMENT NAME | JOB OWNER NAME | DEVICE NAME | START DATE AND TIME | CHARGING TARGET | CHARGING DATA |
| INVOICE TO "A" COMPANY.DOC | TARO KAKIN | Laser Printer 10... | 2006/10/21 15:30:45 | BILLING CODE | 111000-2300-456 |
| INVOICE TO "B" COMPANY.DOC | TARO KAKIN | Laser Printer 10... | 2006/10/21 15:40:23 | BILLING CODE | 111000-2300-456 |

[APPLY CHANGE] [CANCEL] [NO CHANGE APPLIED]

CHARGING DATA CHANGE RESULT NOTIFICATION

THE FOLLOWING CHANGES HAVE BEEN SUCCESSFULLY APPLIED.

[CHANGE TARGET JOB]
DOCUMENT NAME: INVOICE TO "A" COMPANY.DOC
JOB OWNER NAME: TARO KAKIN
DEVICE NAME: Laser Printer 1000
START DATE AND TIME: 2006/10/21 15:30:45
CHARGING TARGET: BILLING CODE
CHARGING DATA: 111000-2300-456

[CHANGE TARGET DATA]
CHARGING TARGET: BILLING CODE
CHARGING DATA: 122000-2500-456

OK

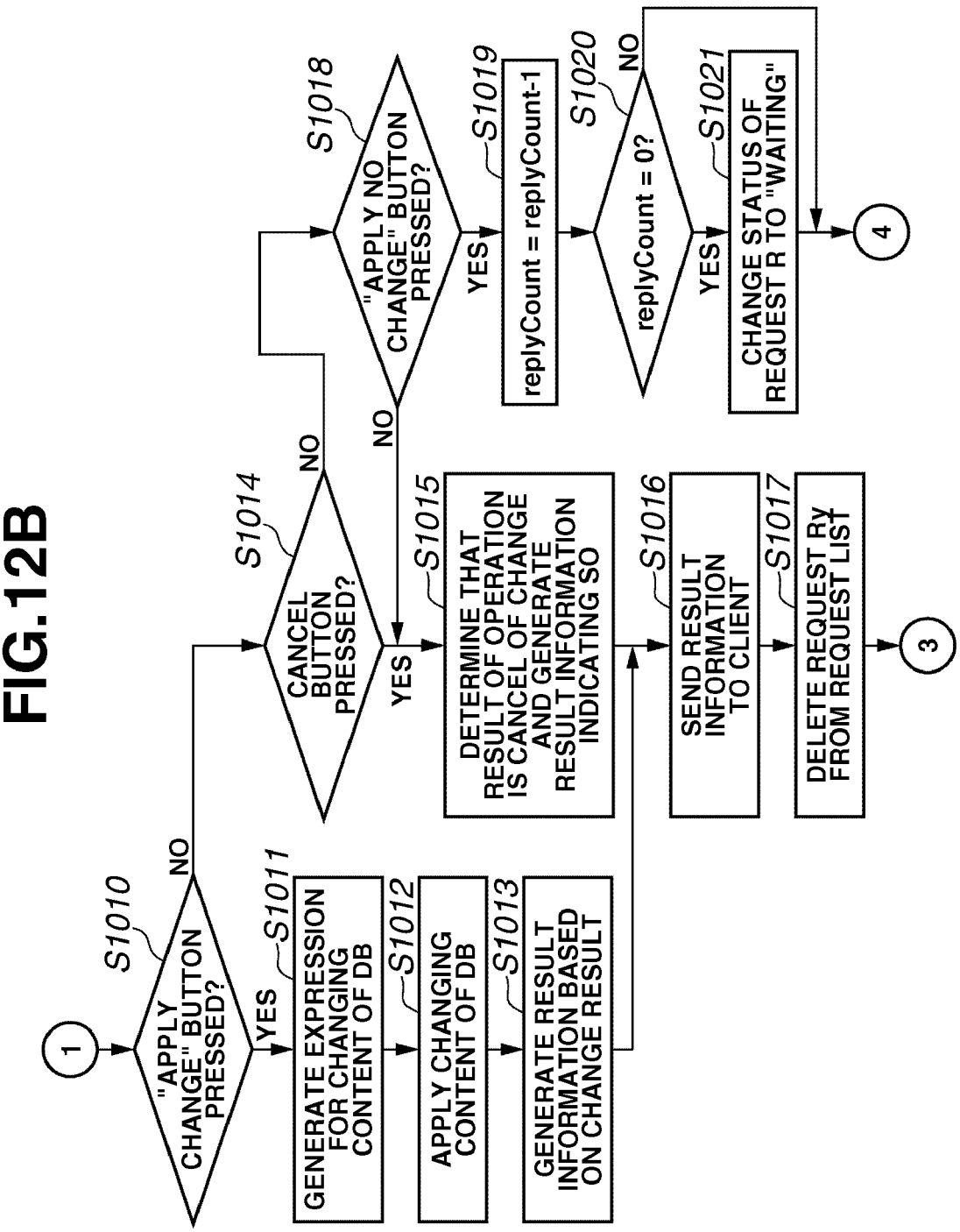

FIG.13A

| MEMBER OF REQUEST R | INITIAL VALUE | VALUE |
|---|---|---|
| requestID:<br>REQUEST ID | 1 | A UNIQUE ID IS PROVIDED PER EACH REQUEST. THE ID IS INCREMENTED BY 1 UPON EACH NEW REQUEST. THIS ID IS UTILIZED FOR IDENTIFYING A REQUEST AT THE TIME OF RECEIVING A REPLY FROM CLIENT. |
| status:<br>REQUEST PROCESSING STATUS | new | new: NEWLY GENERATE A REQUEST<br>waiting: SET AT THE TIME OF UPDATING DB<br>reply_waiting: SET WHEN REPLY FROM CLIENT IS RECEIVED |
| replyCount:<br>NUMBER OF VERIFICATION REQUESTS YET TO BE REPLIED | 0 | THIS VALUE INDICATES THE NUMBER OF VERIFICATION REQUESTS YET TO BE REPLIED FROM CLIENT. WHEN SENT, THE VALUE IS INCREMENTED BY 1. WHEN REPLIED, THE VALUE IS DECREMENTED BY 1. |
| MaxWaitTime:<br>MAXIMUM WAIT TIME | CLIENT-DESIGNATED DEVICE-DEPENDENT VALUE | IF DEVICE IS SET IN CHARGING DESTINATION CHANGE REQUEST, THEN NEXT JOB LOG ACQUISITION ENABLED SCHEDULED DATE AND TIME +α (MARGIN NECESSARY FOR UPDATING DB) FOR THE DEVICE IS SET. IF NO DEVICE HAS BEEN DESIGNATED, THE JOB LOG ACQUISITION ENABLED SCHEDULED DATE AND TIME +α (MARGIN NECESSARY FOR UPDATING DB) FOR ALL DEVICES IS SET. |

FIG. 13B

| MEMBER OF REQUEST R | INITIAL VALUE | VALUE |
|---|---|---|
| CLIENT-DESIGNATED JOB INFORMATION<br>JOB TYPE<br>JOB OWNER NAME<br>JOB PERFORMING DATE AND TIME<br>DOCUMENT NAME<br>DEVICE NAME<br>DEVICE ADDRESS<br>CHARGING TARGET<br>CHARGING DATA, etc. | CLIENT-DESIGNATED VALUE | JOB TYPE: PRINT/COPY/SCAN/FAX, etc.<br>JOB OWNER NAME: NAME OF PERSON WHO PERFORMED THE JOB<br>JOB PERFORMING DATE AND TIME: DATE AND TIME OF PERFORMING JOB<br>DOCUMENT NAME: DOCUMENT NAME CAN BE DESIGNATED IF DOCUMENT NAME IS RECORDED IN JOB LOG (IN THE CASE OF PRINT JOB OR FAX JOB). DOCUMENT NAME CAN BE EXPRESSED IN REGULAR EXPRESSION, USING AN ASTERISK OR THE LIKE.<br>DEVICE NAME: NAME OF MANAGEMENT DEVICE<br>DEVICE ADDRESS: IP ADDRESS OR THE LIKE OF DEVICE<br>CHARGING TARGET: CHARGING TARGET USER NAME, CHARGING TARGET GROUP NAME, AND BILLING CODE (CODE FOR MANAGING CHARGE)<br>CHARGING DATA: DATA OF EACH CHARGING TARGET (USER NAME, GROUP NAME, AND USER (GROUP) CODE) |
| CLIENT-DESIGNATED CHARGING DESTINATION INFORMATION CHANGE DATA<br>CHARGING TARGET<br>CHARGING DATA, etc. | CLIENT-DESIGNATED VALUE | CHARGING TARGET: CHARGING TARGET USER NAME, CHARGING TARGET GROUP NAME, AND BILLING CODE (CODE FOR MANAGING CHARGE)<br>CHARGING DATA: DATA OF EACH CHARGING TARGET (USER NAME, GROUP NAME, AND USER (GROUP) CODE) |
| SEARCH DEVICE LIST | WITH RESPECT TO CLIENT-DESIGNATED DEVICE: INITIALIZE DevSearchInfo WITH [Device ID = CORRESPONDING Device ID, update Flag = OFF, result = 0], AND THEN REGISTER THE RESULT IN SEARCH DEVICE LIST | THIS IS A LIST OF SEARCHING DEVICE INFORMATION (DevSearchInfo) GENERATED FROM DEVICE NAME/DEVICE LIST, AMONG CLIENT-DESIGNATED JOB INFORMATION. DevSearchInfo INCLUDES THREE ELEMENTS, SUCH AS DEVICE ID (DeviceID), UPDATE FLAG (update Flag), AND SEARCH RESULT (result).<br>WHEN RECEIVING DB UPDATE NOTIFICATION FOR THE CORRESPONDING DEVICE ID, SET UPDATE FLAG TO BE ON. THEN, SET THE SEARCH RESULT AS THE result.<br>IN THE EMBODIMENT, SEARCH RESULT IS SET ONLY WHEN THE RESULT IS "FAILURE". |

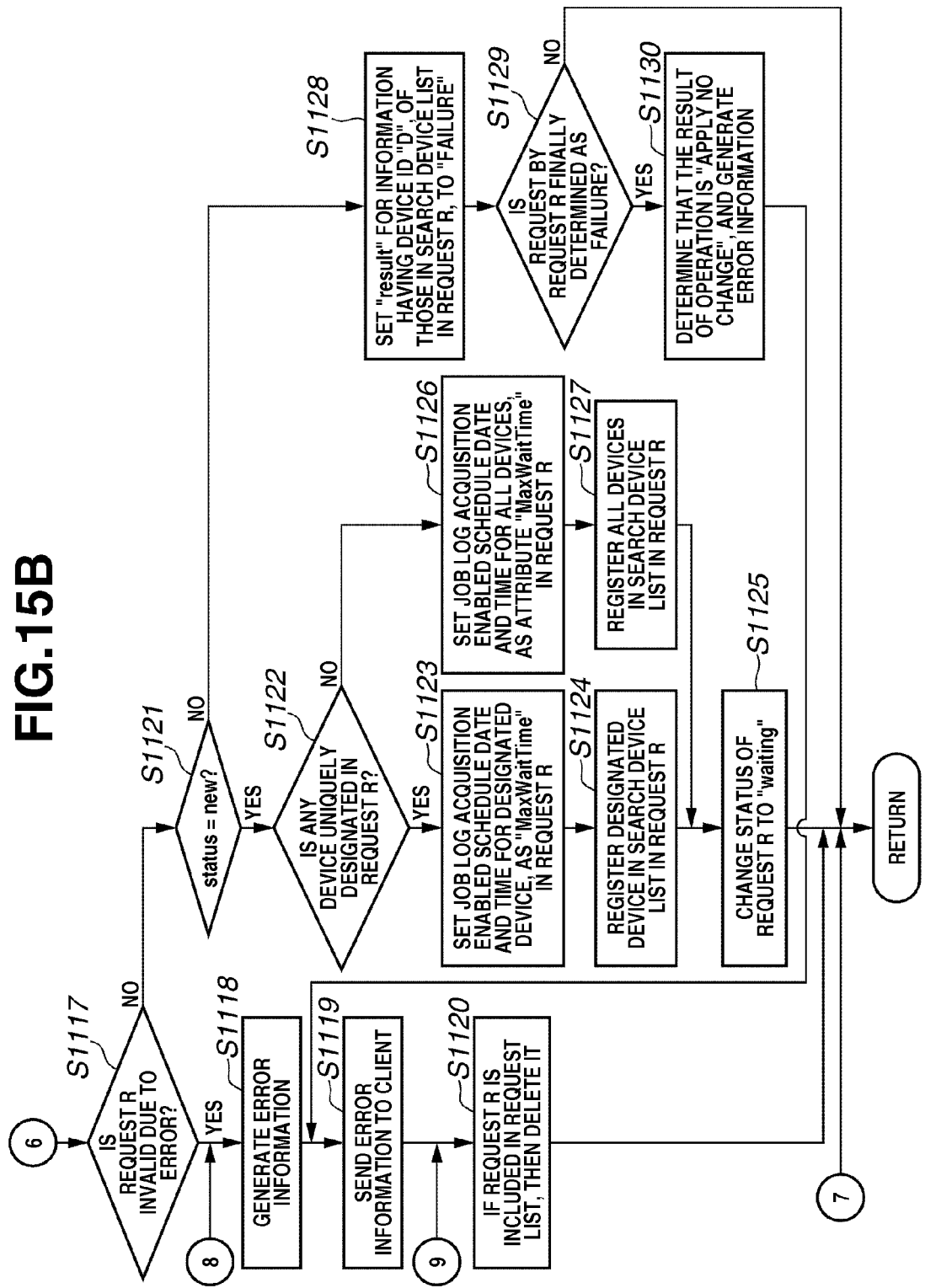

JOB LOG MANAGEMENT SYSTEM AND JOB LOG MANAGEMENT METHOD

BACKGROUND OF THE INVENTION

1. Field of the Invention

The present invention relates to a job log management system, a job log management method, and a computer-executable program therefor. More specifically, the present invention relates to a job log management system configured to manage a job log (a job history).

2. Description of the Related Art

In the case of a conventional job log management system that stores a log about a job such as a print job, a scan job, or a facsimile transmission job and manages the stored job log, a user can, at the time of performing a job, designate information about a charging destination whose fee is to be counted. Furthermore, in the case of such a conventional job log management system, a user can designate information about a counting target (i.e., a user or a user group such as a division to which a user belongs) concerning whom the number of processed pages as a job is to be counted.

For example, Japanese Patent Application Laid-Open No. 2004-362015 discusses a method for easily charging a print product distribution destination in the case of a print request whose request source and the distribution target differs from each other. More specifically, the method discussed by Japanese Patent Application Laid-Open No. 2004-362015 enables a print requesting person to change print requesting person information which is stored in a print history (job log) to print product distribution destination information after a print job is completed according to an authority of the requesting person. Thus, the method discussed by Japanese Patent Application Laid-Open No. 2004-362015 implements designation of a charging destination.

Charging destination information and counting target information have the same characteristics since they are data designated by a user in a job log. The other data in a job log includes, in the case of a print job, print result information such as a document name, a print user name (print requesting person name), a number of printed pages, the color mode (color or monochromatic), the print mode (two-sided or one-sided), whether to sort or finish the printed product, the paper size, print date and time, and the paper type, which a user cannot change.

Since the charging destination information and the counting target information is designated by a user, a user may make a mistake (designate wrong information, for example) in designating it. A job log is generally stored in a database (hereinafter simply referred to as a "DB") managed by the system. Thus, after a user has designated wrong information, the user can search the DB for the data to be changed and change the extracted data.

For example, a user can relatively easily change the charging destination information and the counting target information in the following manner. First, a job log management apparatus acquires a log of jobs that a user has recently performed from the DB and then displays the jobs on a user interface (UI) of a user's personal computer (PC), as a list. The user selects a job that the user desires to change and input, via the UI, desired appropriate information in the job log of the selected job. With such a function, a job log management apparatus can update a database with the information input in the log of the job designated by the user.

However, in the case of the conventional method described above, in order to change the charging destination information and the counting target information, it is necessary to previously store a job log in a database. Meanwhile, a user desires to change the charging destination information and the counting target information when the user has designated a wrong job or input wrong information. Accordingly, in most cases, a user desires to change the charging destination information and the counting target information immediately after a completion of a job.

However, the timing at which a job log is stored in a database differs according to how the job log has been acquired, a time length taken for acquiring the job log, and the device type.

For example, a device such as a large-sized multifunction peripheral (MFP) having a mass storage device such as a hard disk can store a large number of job logs. Accordingly, in the case of a device having a mass storage device such as a hard disk, a conventional job log management apparatus stores job logs in a database of once every night at midnight when the amount of data communication is relatively small.

Meanwhile, with respect to job logs stored on a device having no storage unit (hard disk) or only a storage unit of a small storage capacity, the time interval for storing the job logs into the database is relatively short. However, in terms of a network communication efficiency, a conventional job log management apparatus stores the job log at a longest possible time interval according to the capacity of the device. Thus, in most cases, the job log of a print job may not be stored in the database immediately after the print job is completed.

Accordingly, it is necessary for a user to wait until a job log is stored in a database or wait for a sufficiently long time after completing a print job to start processing for changing a job log. However, in this case, the user may leave unperformed the operation for changing the job log or forget information to be designated (changed) in the job log.

SUMMARY OF THE INVENTION

The present invention is directed to a job log management apparatus configured to allow a user to change a job log at a most appropriate timing that the user desires and a method therefor.

According to an aspect of the present invention, a job log management system configured to manage a job log in a database, generated according to processing of a job by a device includes a search unit configured, when a user designates a search condition for searching for the job log whose content is desired to be changed and issues a change request of the job log, to search the database for a job log that satisfies the search condition, a re-search unit configured, if the job log that satisfies the search condition is not extracted by the search unit, to wait until the database managing the job log is updated and then perform a re-search for the job log that satisfies the search condition without receiving an instruction for re-searching for the job log from the user, a changing unit configured, when the job log that satisfies the search condition is extracted by the re-search unit, to change a content of the job log according to the change request issued by the user, and a notification unit configured to send notification information about a result of the change performed by the changing unit.

According to another aspect of the present invention, a management server configured to manage a job log generated according to processing of a job by a device connected to the management server via a network includes a database configured to store the job log acquired from the device, a search unit configured, when a user designates a search condition for searching for the job log whose content is desired to be changed and issues a change request of the job log, to search the database for a job log that satisfies the search condition, a re-search unit configured, if the job log that satisfies the search condition is not extracted by the search unit, to wait until the database managing the job log is updated and then perform a re-search for the job log that satisfies the search condition without receiving an instruction for re-searching for the job log from the user, a changing unit configured, when the job log that satisfies the search condition is extracted by the re-search unit, to change a content of the job log according to the change request issued by the user, and a sending unit configured to send information about a result of the change performed by the changing unit to a client terminal apparatus to notify the user of the change result information.

According to yet another aspect of the present invention, a method for managing a job log in a database, generated according to processing of a job by a device, includes searching the database for a job log that satisfies a search condition when a user designates the search condition for searching for the job log whose content is desired to be changed and issues a change request of the job log, performing a re-search for the job log that satisfies the search condition without receiving an instruction for re-searching for the job log from the user, after waiting until the database managing the job log is updated if the job log that satisfies the search condition is not extracted, changing a content of the job log when the job log that satisfies the search condition is extracted, and sending notification information about a result of the change applied to the job log.

According to yet another aspect of the present invention, a method in a management server having a database configured to store a job log generated according to processing of a job by a device connected to the management server via a network, includes searching the database for a job log that satisfies a search condition when a user designates the search condition for searching for the job log whose content is desired to be changed and issues a change request of the job log, performing a re-search for the job log that satisfies the search condition without receiving an instruction for re-searching for the job log from the user, after waiting until the database managing the job log is updated if the job log that satisfies the search condition is not extracted, changing a content of the job log based on the change request designated by the user when the job log that satisfies the search condition is extracted, and sending information about a result of the change applied to the job log to a client terminal apparatus to notify the user of the change result information.

According to yet another aspect of the present invention, instructions cause a computer to perform a method in a management server having a database configured to store a job log generated according to processing of a job by a device connected to the management server via a network. The method includes searching the database for a job log that satisfies a search condition when a user designates the search condition for searching for the job log whose content is desired to be changed and issues a change request of the job log, performing a re-search for the job log that satisfies the search condition without receiving an instruction for re-searching for the job log from the user, after waiting until the database managing the job log is updated if the job log that satisfies the search condition is not extracted, changing a content of the job log based on the content of change designated by the user when the job log that satisfies the search condition is extracted, and sending information about a result of the change applied to the job log to a client terminal apparatus to notify the user of the change result information.

According to yet another aspect of the present invention, a computer-readable storage medium stores instructions which cause a computer to perform a method in a management server having a database configured to store a job log generated according to processing of a job by a device connected to the management server via a network the method including searching the database for a job log that satisfies a search condition when a user designates the search condition for searching for the job log whose content is desired to be changed and issues a change request of the job log, performing a re-search for the job log that satisfies the search condition without receiving an instruction for re-searching for the job log from the user, after waiting until the database managing the job log is updated if the job log that satisfies the search condition is not extracted, changing a content of the job log based on the content of change designated by the user when the job log that satisfies the search condition is extracted, and sending information about a result of the change applied to the job log to a client terminal apparatus to notify the user of the change result information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 9 illustrates an example configuration of a charging destination change request UI according to the first exemplary embodiment of the present invention.

FIG. 10 illustrates an example configuration of a charging destination change verification UI according to the first exemplary embodiment of the present invention.

FIG. 11 illustrates an example configuration of a charging destination change result UI according to the first exemplary embodiment of the present invention.

FIG. 12B is a flow chart illustrating processing continued from the processing in the flow chart of FIG. 12A according to the first exemplary embodiment of the present invention.

FIGS. 13A and 13B illustrate an example of a member included in a request class instance according to the first exemplary embodiment of the present invention.

FIG. 15B is a flow chart illustrating processing continued from the processing in the flow chart of FIG. 15A according to the first exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
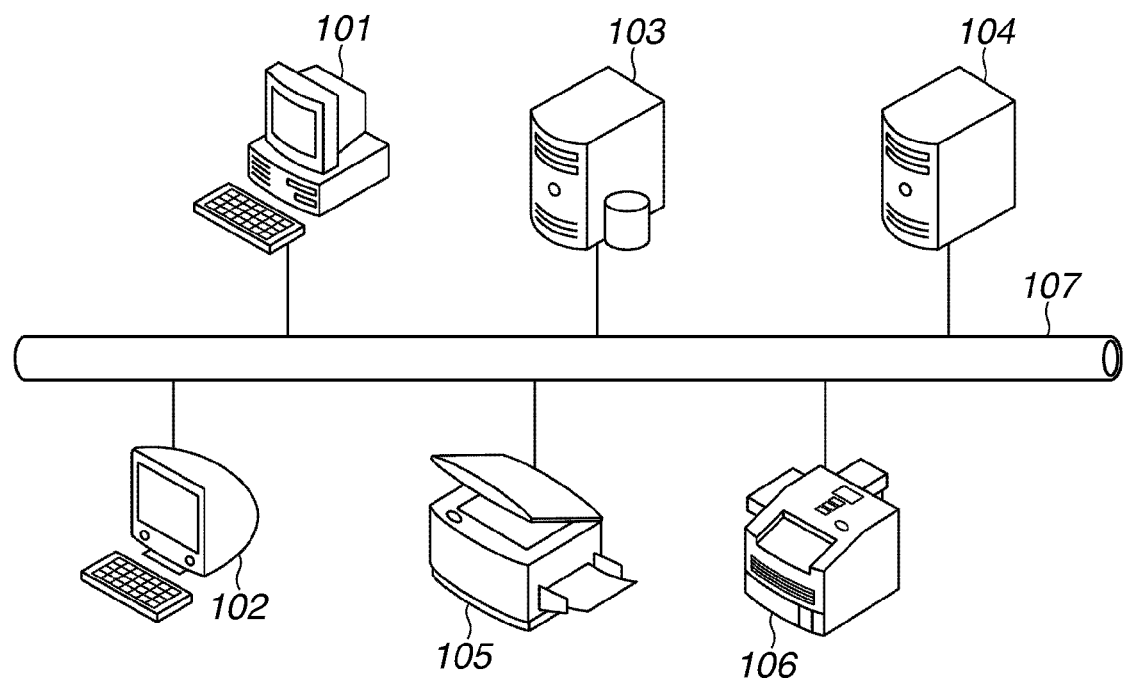
FIG. 1 illustrates an example configuration of a job log management system according to a first exemplary embodiment of the present invention.

A first exemplary embodiment of the present invention will be described below. FIG. 1 illustrates an example configuration of a job log management system according to the present exemplary embodiment.

Referring to FIG. 1, client terminal apparatuses (information processing apparatuses) 101 and 102 are, for example, a PC configured to execute various programs such as an application program. The client terminal apparatuses 101 and 102 are connected to a network 107 such as a local area network (LAN), a wide area network (WAN), or the Internet, via a network cable such as the Ethernet® or a public line.

The client terminal apparatuses 101 and 102 each include a job log collection unit. The job log collection unit executes a program for performing a request for changing a job log (charging information and counting information) to collect a job log as needed and stores the collected job logs in a database (DB) server 103. Here, as illustrated in FIG. 1, a plurality of client apparatuses (the client terminal apparatuses 101 and 102) is used in the present exemplary embodiment. However, the number of client terminal apparatuses is not limited to the one illustrated in FIG. 1. That is, one client terminal apparatus or a plurality of client terminal apparatuses can be used.

The DB server (information processing apparatus) 103 according to the present exemplary embodiment stores a job log. Like the client terminal apparatuses 101 and 102, the DB server 103 is connected to the network 107. In the present exemplary embodiment, the job log management system includes the DB server 103. However, the job log management system can include no DB server 103. In a case where the job log management system includes no DB server 103, the job log can be stored on user's client terminal apparatuses 101 and 102, a server (file server) other than the DB server 103, or a device (an MFP 105 or a network printer 106, for example).

A management server (information processing apparatus) 104 includes a change request receiving unit, a verification request sending unit, and a processing result sending unit, which are used in data communication between the management server 104 and the client terminal apparatuses 101 and 102, as programs. Furthermore, the management server 104 includes a DB searching unit, a DB changing unit, a DB update notification generation unit, and a DB search waiting unit, which are used in performing processing on the DB server 103, as programs.

In addition, the management server 104 includes a job log storage unit used for storing a job log received from the client terminal apparatuses 101 and 102 (the job log collection unit) on the DB server 103, as a program. Like the DB server 103, the management server 104 is connected to the network 107.

In the present exemplary embodiment, the job log management system includes the management server 104. However, the job log management system can include no management server 104. In a case where the job log management system includes no management server 104, the job log can be stored on user's client terminal apparatuses 101 and 102, a server (file server) other than the management server 104, or a device (the MFP 105 or the network printer 106, for example). In the present exemplary embodiment, the function as the DB server 103 and the function as the management server 104 are provided on different apparatuses. However, the functions can be collectively provided in one server.

The MFP 105 includes functions as a print control apparatus, a scanner, and a copying machine. The network printer 106 is an image forming apparatus. The MFP 105 and the network printer 106 analyze and process a print request sent from the client terminal apparatuses 101 and 102.

In the present exemplary embodiment, various type printers such as an electrophotographic laser beam printer, an ink jet printer, or a thermal transfer printer can be used as the network printer 106.

The client terminal apparatuses 101 and 102, the DB server 103, and the management server 104 are general information processing apparatuses. The client terminal apparatuses 101 and 102, the DB server 103, and the management server 104 store and can execute a job log management program for performing processing for managing a job log.

Figure 2:
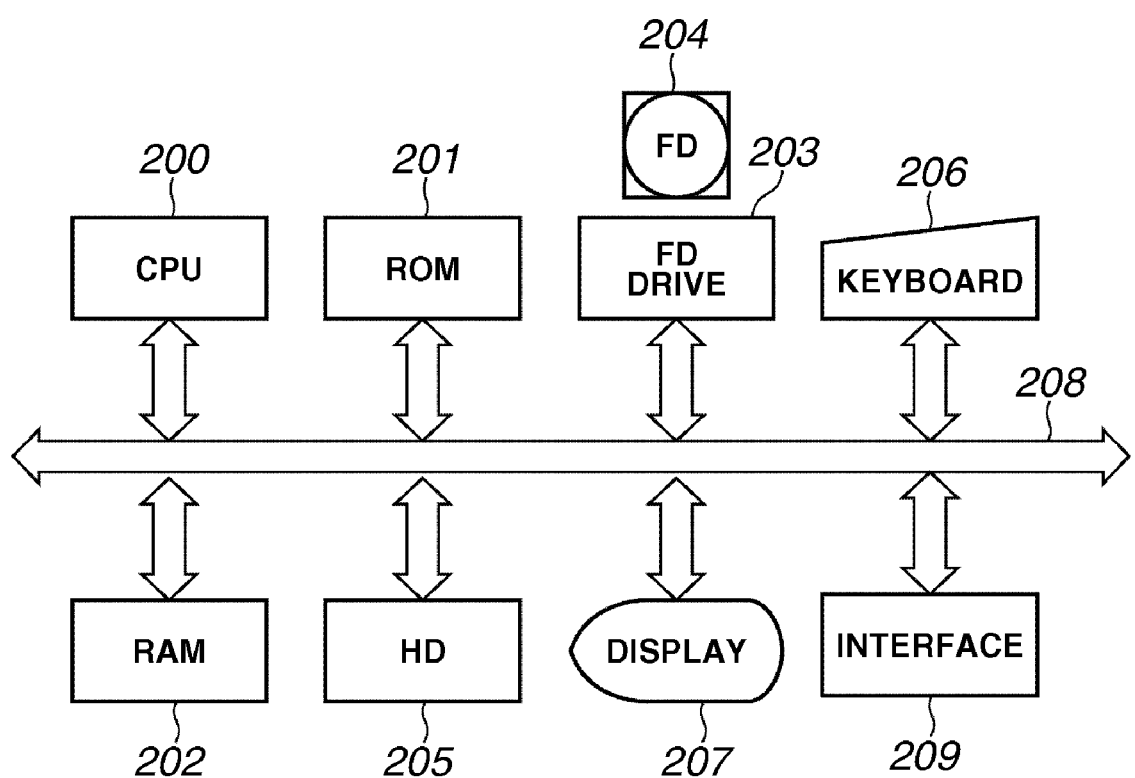
FIG. 2 illustrates an example configuration of an information processing apparatus according to the first exemplary embodiment of the present invention.

FIG. 2 illustrates an example configuration of the information processing apparatus according to the present exemplary embodiment. The client terminal apparatuses 101 and 102, the DB server 103, and the management server 104 have substantially the same or similar hardware configuration. Accordingly, the exemplary configuration of the client terminal apparatuses 101 and 102, the DB server 103, and the management server 104 will be described below with reference to FIG. 2.

Referring to FIG. 2, a central processing unit (CPU) 200 controls the entire operation of the information processing apparatus. The CPU 200 loads and executes an application program, an operating system (OS), and the job log management program from a hard disk (HD) 205. Furthermore, the CPU 200 temporarily stores information and files necessary for performing the programs on a random access memory (RAM) 202.

A read-only memory (ROM) (storage unit) 201 stores a program such as a basic input/output (I/O) program. The RAM 202 is a temporary storage unit and functions as a main memory or a work area for the CPU 200.

An FDD 203 is a storage medium reading unit. As will be described in detail below with reference to FIG. 6, a program stored on an FD (storage medium) 204 can be loaded on the computer system via the FDD 203. In the present exemplary embodiment, the storage medium is not limited to an FD. That is, an arbitrary storage medium such as a compact disk-read only memory (CD-ROM), a CD-recordable (CD-R), a CD-rewritable (CD-RW), a PC card, a digital versatile disk (DVD (a DVD-read only memory (DVD-ROM) or a DVD-rewritable (DVD-RW)), an integrated circuit (IC) memory card, an magneto-optical disk (MO), or a memory stick can be used.

The FD (a computer-readable storage medium) 204 stores a computer-executable program. The HD 205 is an external storage unit and functions as a large-capacity memory. The HD 205 stores an application program, an OS, the job log management program, and an associated program.

A keyboard 206 is an instruction input unit. The keyboard 206 can be operated by a user to issue various instructions, such as an instruction for printing a document or changing the charging information or the counting target information, to the client terminal apparatuses 101 and 102.

A display (display unit) 207 displays alternatives, setting screens, and acquired information used by a user to issue an instruction via the keyboard 206. Data can be transmitted within the information processing apparatus (the client terminal apparatuses 101 and 102, the DB server 103, and the management server 104) via a system bus 208. An interface 209 is an input/output unit. The information processing apparatus sends and receives data to and from an external apparatus via the interface 209.

Figure 3:
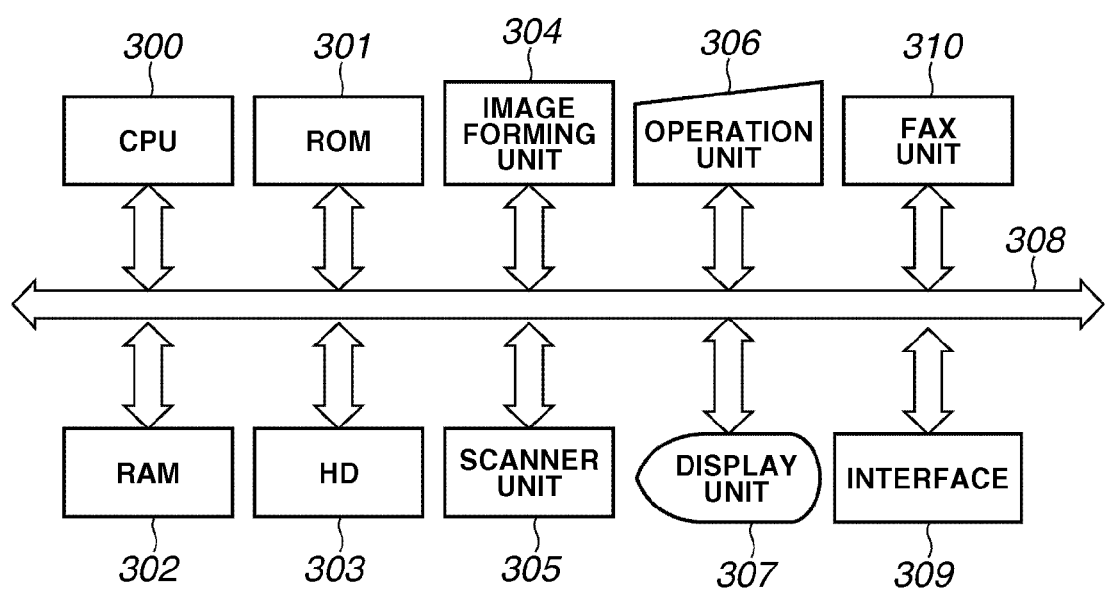
FIG. 3 illustrates an example configuration of an image forming apparatus (an MFP and a network printer) according to the first exemplary embodiment of the present invention.

FIG. 3 illustrates an example configuration of the image forming apparatus (the MFP 105 and the network printer 106) according to the present exemplary embodiment. In the present exemplary embodiment, the MFP 105 has a configuration similar to the network printer 106, except that the MFP 105 has a scanner unit and a facsimile unit while the network printer 106 does not.

Referring to FIG. 3, a CPU 300 controls the entire operation of the image forming apparatus. The CPU 300 executes a print control program, an application program, an OS, and the job log management system stored on an HD 303. Furthermore, the CPU 300 temporarily stores information and files necessary for performing the programs on a RAM 302.

A ROM (storage unit) 301 stores a program such as an apparatus control program or a basic I/O program. The RAM 302 is a temporary storage unit and functions as a main memory or a work area for the CPU 300.

The HD 303 is an external storage unit and functions as a large-capacity memory. The HD 303 stores an application program, an OS, the job log management program, and associated data.

An image forming unit 304 is activated when raster data stored on the HD 303 as spool data is loaded on the RAM 302. The image forming unit 304 forms an image based on the raster data read from the RAM 302. The RAM 302 has a backup power supply of a battery (not illustrated) and can store a job log of a print job, a scan job, or a facsimile transmission job performed by each user as necessary. As the storage memory, other non-volatile memory such as an electrically erasable programmable ROM (EEPROM) can be used instead of the RAM 302.

A print job, which is a job sent from the client terminal apparatuses 101 and 102, is transmitted via an interface 309 and a system bus 308. The CPU 300 performs a control for analyzing a print request, rasterizing an image of the print job on the RAM 302, and storing the raster data on the HD 303 as spool data.

An operation unit 306 is an instruction input unit and can be operated by a user to issue various instructions to the image forming apparatus. A display unit 307 displays a setting screen and acquired information on the operation unit 306.

Data can be transmitted within the image forming apparatus via the system bus 308. The interface 309 is an input/output unit. The image forming apparatus sends and receives data to and from an external apparatus via the interface 309.

A scanner unit 305 irradiates a document (a document that has been printed on a recording medium such as a paper sheet) with a light beam and reads the reflected light beam with a sensor (not illustrated). The scanner unit 305 then generates scan data based on an image signal converted from the reflection light, and sends the generated scan data to the HD 303 or the RAM 302, depending on the intended use of the data.

A facsimile unit 310 sends and receives facsimile data via the interface 309. The scanner unit 305 and the facsimile unit 310 are included in the MFP 105 but not included in the network printer 106. Accordingly, with respect to the network printer 106, the type of a job whose log (the charging destination or the counting target) can be changed is a print job only. On the other hand, with respect to the MFP 105, the type of a job whose log can be changed includes a scan job, a copy job, and a facsimile transmission job, in addition to a print job.

Figure 4:
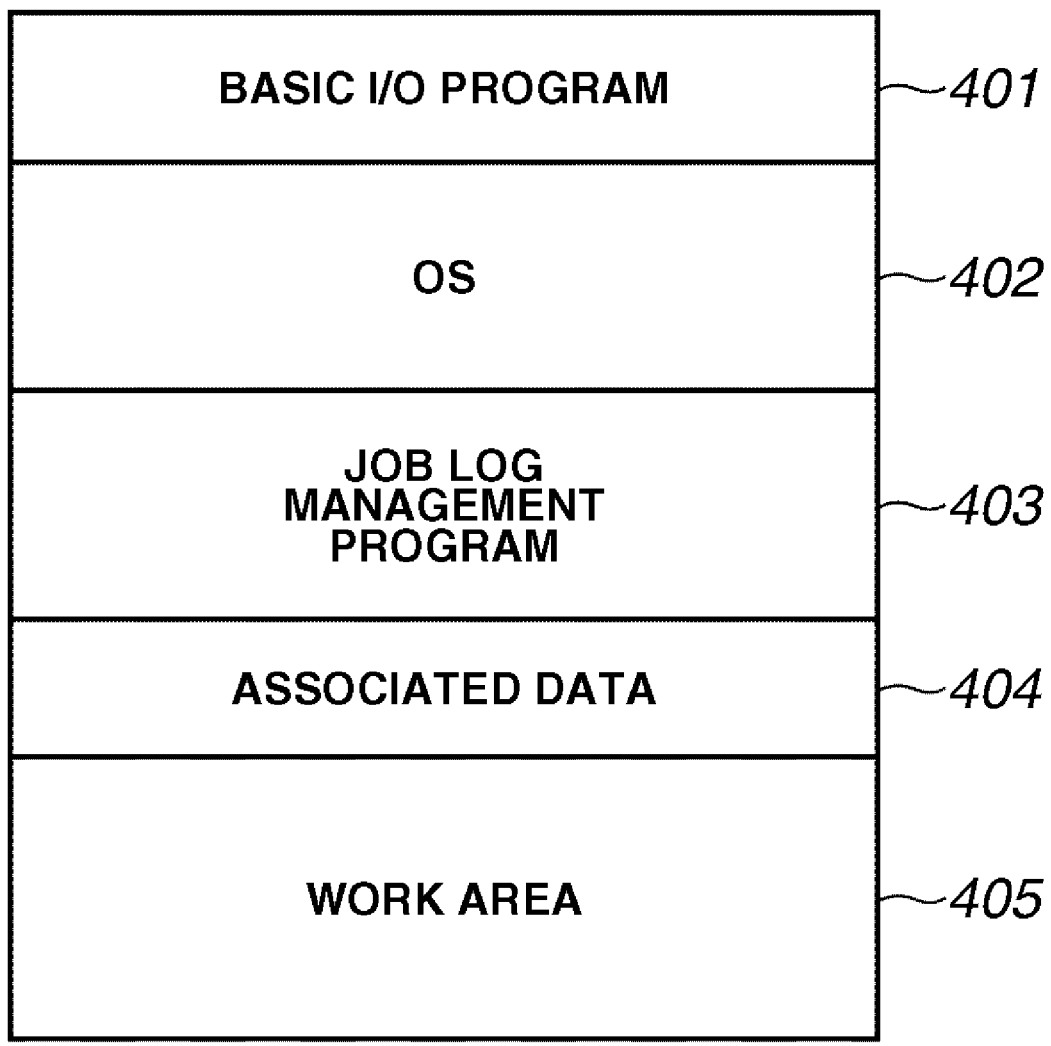
FIG. 4 illustrates an example memory map of a RAM of the information processing apparatus and a RAM of the image forming apparatus, according to the first exemplary embodiment of the present invention.

FIG. 4 illustrates an example memory map of the RAM 202 of the information processing apparatus and the RAM 302 of the image forming apparatus, according to the present exemplary embodiment. More specifically, the example illustrated in FIG. 4 is a memory map of the RAM 202 at the time the job management program is loaded from the FD 204 to the RAM 202 to be executed thereon.

Referring to FIG. 4, when the information processing apparatus is powered on, the CPU 200 loads the OS 402 from the HD 205 onto the RAM 202. In an area storing a basic I/O program 401, a program having an initial program loading (IPL) function for starting the operation of the OS 402 is stored.

A job log management program 403 and associated data 404 for the job log management program 403 are stored in a corresponding area of the RAM 202, respectively. A work area 405 is used when the CPU 200 executes the job log management program 403.

In the present exemplary embodiment, the CPU 200 loads and executes the job log management program 403 and the associated data 404 directly from the FD 204 on the RAM 202. However, other methods other can also be used to load the job log management program 403 and the associated data 404. For example, the CPU 200 or the CPU 300 can load the job log management program 403 from the HD 205 or the HD 303, on which the job log management program 403 has been installed, onto the RAM 202 or the RAM 302 every time the job log management program 403 is executed.

Furthermore, a CD-ROM, a CD-R, a CD-RW, a PC card, a DVD (a DVD-ROM or a DVD-RW), or an IC memory card can be used as the storage medium for storing the job log management program 403 other than the FD 204. Moreover, the CPU 200 or the CPU 300 can directly execute the job log management program 403 that has been previously stored on the ROM 201 or the ROM 301 which thus constitutes one part of the memory map.

Alternatively, software that implements the same functions as the above-described units and devices can be used instead of the above-described hardware. Furthermore, in the job log management program 403, a server program and a client program are separately provided. However, the server program can be installed on the client terminal apparatuses 101 and 102 which are client PCs.

Figure 5:
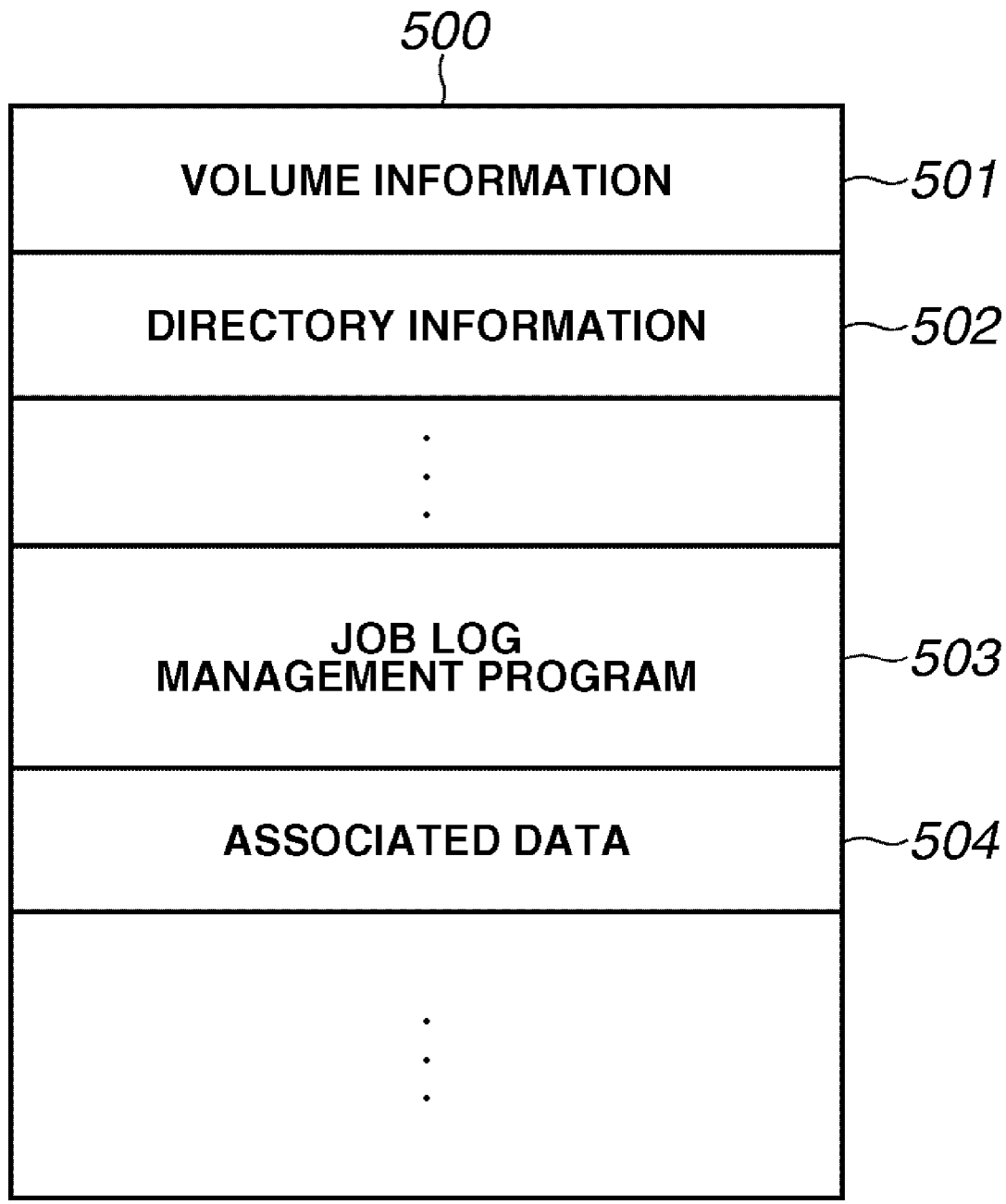
FIG. 5 illustrates an example memory map of a floppy disk (FD) according to the first exemplary embodiment of the present invention.

FIG. 5 illustrates an example memory map of the FD 204 in FIG. 2, according to the present exemplary embodiment.

Referring to FIG. 5, data 500 which is stored on the FD 204 includes volume information 501 which describes information about the data 500, directory information 502, a job log management program 503 and associated data 504 for the job log management program 503. The job log management program 503 is a program generated based on processing in a flow chart according to the present exemplary embodiment.

Figure 6:
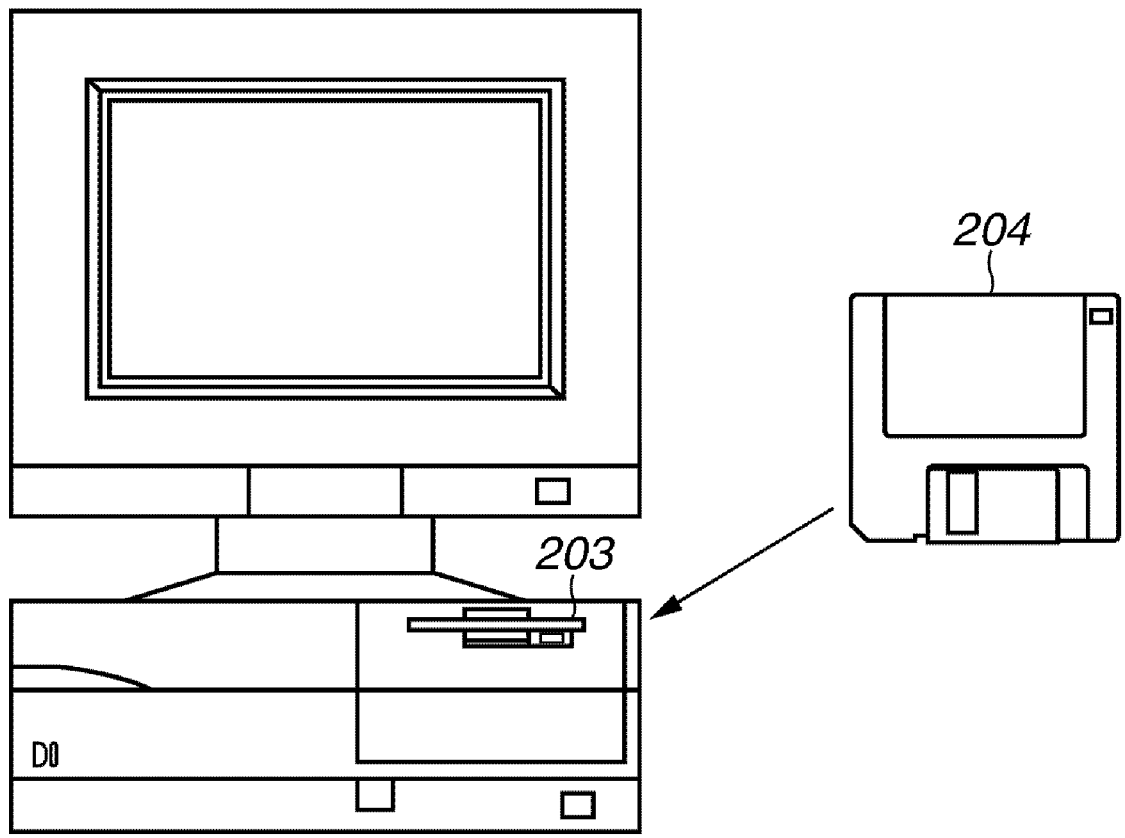
FIG. 6 illustrates an example relationship between an FD drive (FDD) and an FD, which is inserted into the FDD, according to the first exemplary embodiment of the present invention.

FIG. 6 illustrates an example relationship between the FDD 203 (FIG. 2) and the FD 204 (FIG. 2), which is inserted in the FDD 203, according to the present exemplary embodiment. Referring to FIG. 6, the FD 204 stores the job log management program 503 and the associated data 504 according to the present exemplary embodiment.

Figure 7:
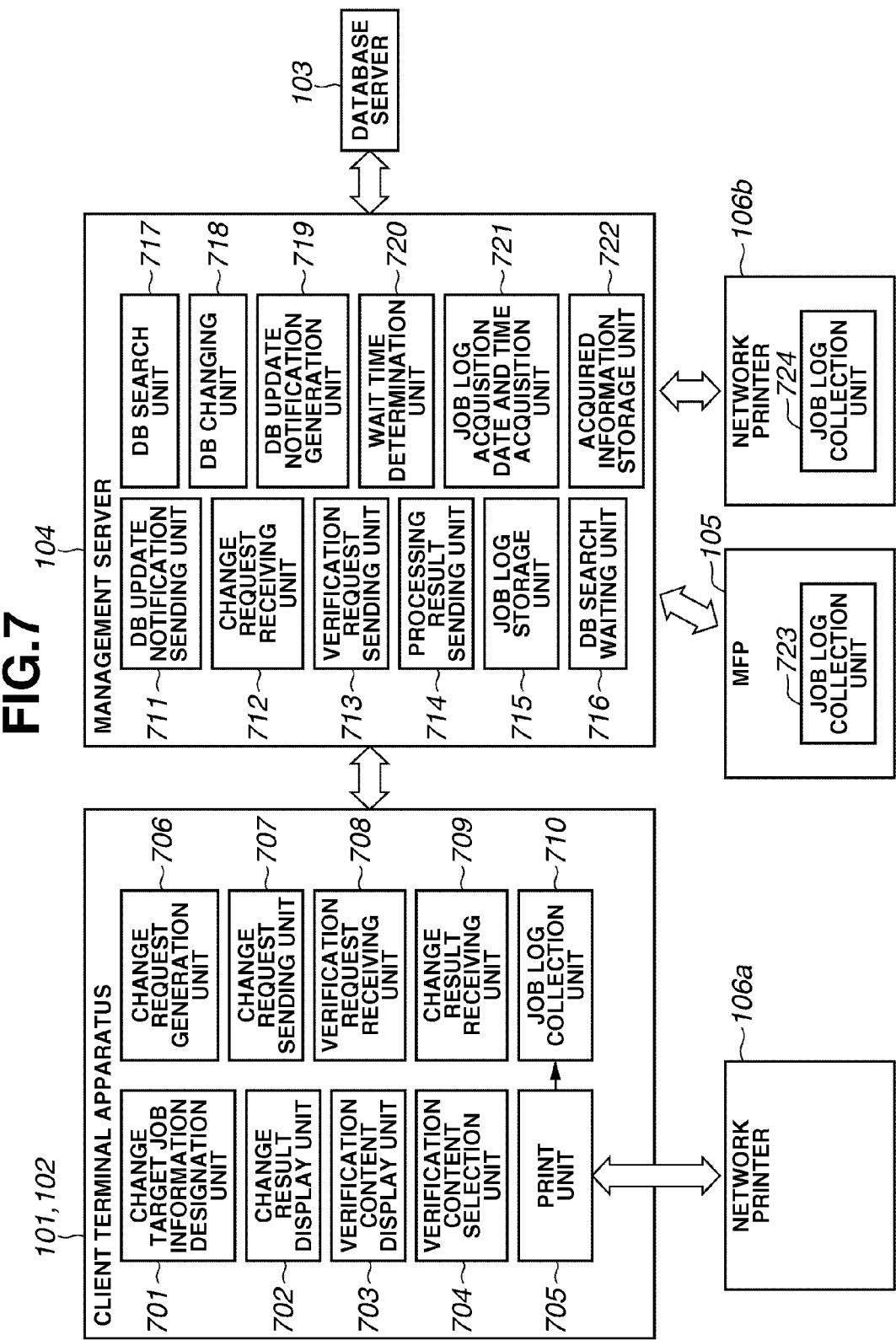
FIG. 7 illustrates an example functional configuration of the job log management system according to the first exemplary embodiment of the present invention.

FIG. 7 illustrates an example functional configuration of the job log management system according to the present exemplary embodiment.

In the present exemplary embodiment, "charging" refers to counting (in a broad sense of term) of a specific amount of fee to be charged, and "counting" refers to counting (in a broad sense of term) of a number of pages, copies, or points. That is, "charging" and "counting" refer to essentially the same operation. Accordingly, although charging processing (in the case of changing a charging destination in a job log) will be described below, substantially similar processing is performed with respect to counting processing.

On each of the client terminal apparatuses 101 and 102, which are print clients, a client program in the job log management program 403 operates. A user looks at a UI screen displayed on the client terminal apparatuses 101 and 102 and issues various instructions such as an instruction for changing a charging destination, via a change target job information designation unit 701, a change result display unit 702, a verification content display unit 703, and a verification content selection unit 704.

A change request generation unit 706 generates a charging destination change request based on a "job whose charging destination is to be changed" and "change target data", which is designated by the user via the change target job information designation unit 701. A change request sending unit 707 sends the generated charging destination change request to the management server 104 via the network 107.

The management server 104 sends a result of processing performed based on the charging destination change request and a change result receiving unit 709 receives the processing result. In a case where it is necessary to verify whether to apply the change of the charging destination via the client, the management server 104 sends a verification request to the client terminal apparatuses 101 and 102. A verification request receiving unit 708 receives the verification request.

On the management server 104, the server program in the job log management program 403 or the job log management program 503 operates. When a change request receiving unit 712 receives the charging destination change request sent from the client terminal apparatuses 101 and 102, a DB search unit 717 analyzes the received charging destination change request. The DB search unit 717 searches the DB server 103 for a log of the corresponding job (job log of the job whose charging destination is to be changed) based on the analysis result. If the corresponding job log is not extracted as a result of the search, the DB search waiting unit 716 waits until a predetermined condition is satisfied.

On the other hand, if the corresponding job is extracted as a result of the search, a DB changing unit 718 changes the charging destination of the job in the corresponding job log. Then, a processing result sending unit 714 sends a result of the processing performed as described above based on the charging destination change request to the client terminal apparatuses 101 and 102. If it is necessary, a verification request sending unit 713, before applying the change to the job log, sends a verification request to the client terminal apparatuses 101 and 102.

A job log storage unit 715 stores on the database server 103 the job log acquired from the client terminal apparatuses 101 and 102 and job log collection units 710, 723, and 724 of the devices (the MFP 105 and a network printer 106b). When the acquired job log is stored on the database server 103, a DB update notification generation unit 719 adds device information for identifying the device that has collected the job log to the job log and generates a DB update notification.

A DB notification sending unit 711 sends the DB update notification to the DB search waiting unit 716. When the DB search waiting unit 716 receives the DB update notification, the DB search waiting unit 716 registers the device indicated in the device information added to the DB update notification on an acquired information storage unit 722 as an information-acquired device. Then, when all devices managed by the management server 104 are registered to the acquired information storage unit 722 as information-acquired devices, the DB search unit 717 searches for a corresponding job again based on an instruction from the DB search waiting unit 716.

As described above, in the present exemplary embodiment, the management server 104 stores on the DB server 103 the job log acquired from the client terminal apparatuses 101 and 102 and the devices (the MFP 105 and the network printer 106b) and generates a DB update notification. However, the present invention is not limited to this exemplary embodiment. That is, the client terminal apparatuses 101 and 102 or the devices (the MFP 105 and the network printer 106b) can store the job log on the DB server 103, generate a DB update notification, and send the DB update notification to the management server 104 (more specifically, to the DB search waiting unit 716 of the management server 104).

In a case where the management server 104 manages a time at which the device acquires a subsequent job log, a wait time determination unit 720 can perform the following processing. That is, the wait time determination unit 720 can acquire a time at which each device managed by the management server 104 acquires a subsequent job log via a job log acquisition date and time acquisition unit 721 (a second acquisition unit).

The wait time determination unit 720 determines the wait time in the DB search waiting unit 716 based on the time at which the device acquires a subsequent job log. More specifically, the wait time determination unit 720 adds a time required for performing job log updating processing on the DB server 103 to the time at which the device acquires a next job log, and determines the calculated time as the wait time in the DB search waiting unit 716.

In FIG. 7, the MFP 105, which is a device having the job log collection unit 723, spontaneously sends the job log to the job log storage unit 715 of the management server 104. The network printer 106b, which has the job log collection unit 724 but does not have a unit for spontaneously sending a job log to the management server 104, sends a job log to the management server 104 as a reply to a job log sending request which is periodically sent from the job log storage unit 715.

A job log of a network printer 106a, which does not have a job log collection unit, is generated by the client terminal apparatuses 101 and 102. More specifically, the job log collection unit 710 collects information sent from the network printer 106a to a print unit 705 of the client terminal apparatuses 101 and 102 and generates a job log based on the collected information. Then, the job log collection unit 710 sends the generated job log to the job log storage unit 715 of the management server 104. The basic control in the job log management system is as described above.

Figure 8:
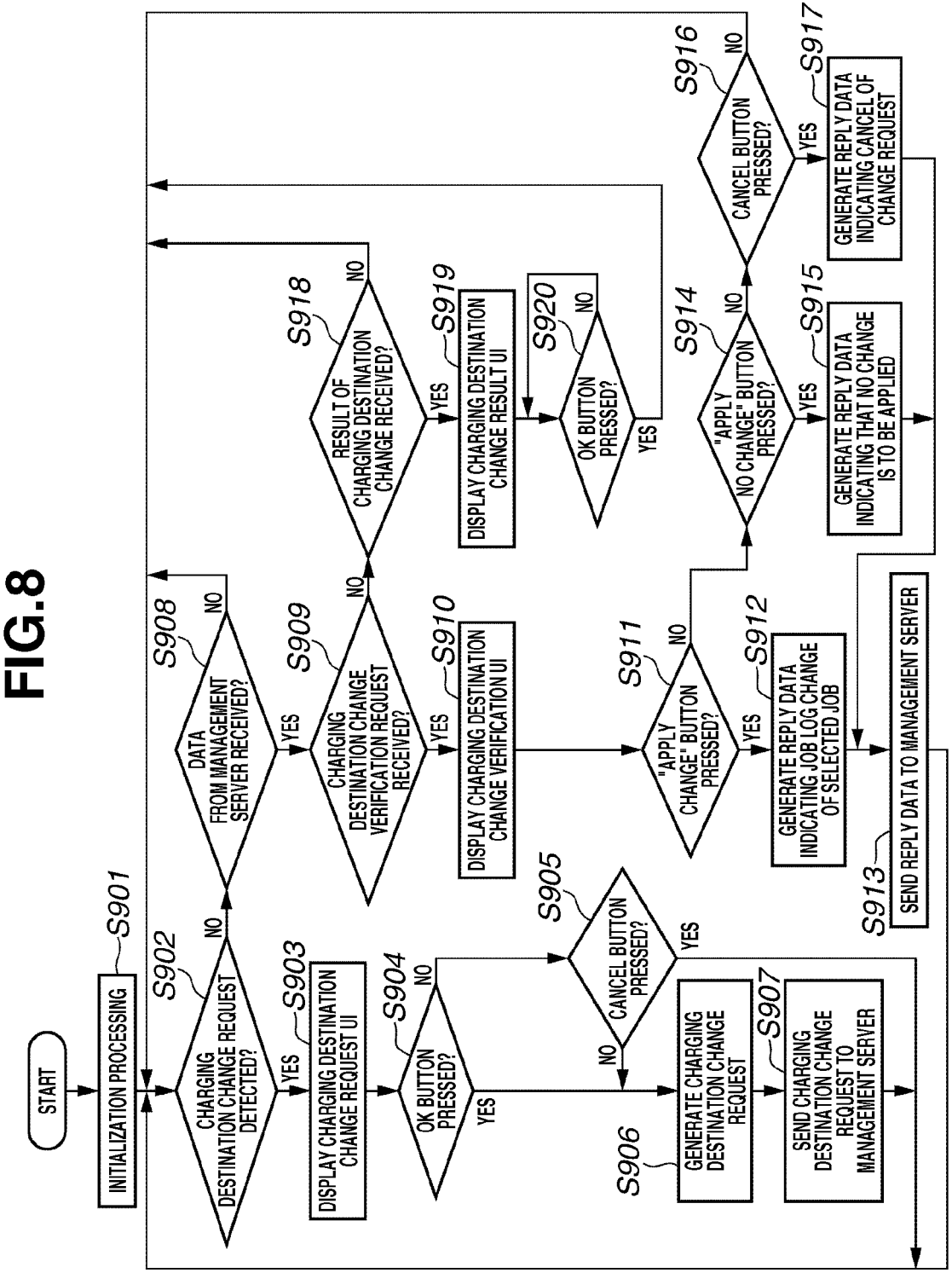
FIG. 8 is a flow chart illustrating an example of processing performed by a client program included in a job log management program according to the first exemplary embodiment of the present invention.

FIG. 8 is a flow chart illustrating an example of processing performed by the client program included in the job log management program 403 according to the present exemplary embodiment. The client program operates on the client terminal apparatuses 101 and 102. The client terminal apparatuses 101 and 102 perform the same processing. Accordingly, processing by the client terminal apparatus 101 will be described below.

Referring to FIG. 8, at the start of the job log management program 403, in step S901, the client terminal apparatus 101 performs necessary initialization processing. The initialization processing includes initialization of variables and communication settings used for sending and receiving various requests.

In step S902, the change target job information designation unit 701 determines whether a charging destination change request has been detected based on a user operation of a menu button. If it is determined that the charging destination change request has been detected (YES in step S902), then the change target job information designation unit 701 displays a charging destination change request UI in step S903.

FIG. 9 illustrates an example configuration of a charging destination change request UI according to the present exemplary embodiment.

A user operates the client terminal apparatus 101 and enters information about an original job whose charging destination information is desired to be changed via a charging destination change request UI 901, as far as the user knows. The charging destination change request UI 901 displays the following information as the information for identifying an original job.

A job type (print/copy/scan/fax)
A document name
A job owner name
A device name
A device address (Internet protocol (IP) address, etc.)
A job performing date and time
A charging target
    (user/user group (division, etc.)/billing code)
Charging data (the value for a charging target)

The charging target and the charging data will be described. In a case where a user is the charging target, the name of a person who performs a job (job owner) is designated in the charging data in most cases. In a case where the charging target is a user group, a name of a group, such as a division, to which the person performing a job belongs is designated in the charging data.

The "billing code" (FIG. 9) refers to a management code used in billing a print fee charging destination such as a customer of the person who performs the job. The charging data is generally represented by a hierarchical combination of numeric figure (or alphabet) strings. The user can enter change target data and operation settings, as well as the information for identifying the original job.

However, the timing for designating the change target data and the operation setting is not limited to this exemplary embodiment. That is, in a case where verification of execution is always required of the user, the user can designate the change target data at the timing of the verification of execution. Furthermore, the timing for designating the operation settings can be fixed uniquely in the system.

As described above, in the present exemplary embodiment, the information for identifying the original job (the information about the change target job) in the charging destination change request UI 901 corresponds to a condition for searching a job whose job log is to be changed, and the change target data corresponds to a content of the change applied to the job log. The operation setting corresponds to whether to verify the job log before applying the change. The device name corresponds to device information. The job performing date and time corresponds to the time for performing the job whose job log is to be changed.

The user presses an OK button after completing the designation of the information of the original job whose charging destination information is to be changed. In step S904, the change target job information designation unit 701 determines whether the OK button on the charging destination change request UI 901 has been pressed by the user. If it is determined that the OK button on the charging destination change request UI 901 has been pressed (YES in step S904), then the processing advances to step S906. In step S906, the change request generation unit 706 generates a charging destination change request. In step S907, the CPU 200 of the client terminal apparatus 101 sends the generated charging destination change request to the management server 104. Then, the processing returns to step S902.

On the other hand, if it is determined that the OK button on the charging destination change request UI 901 has not been pressed (NO in step S904), then the processing advances to step S905. In step S905, the change target job information designation unit 701 determines whether a cancel button on the charging destination change request UI 901 has been pressed by the user.

If it is determined that the cancel button on the charging destination change request UI 901 has not been pressed (NO in step S905), then the processing returns to step S904. On the other hand, if it is determined that the cancel button on the charging destination change request UI 901 has been pressed (YES in step S905), then the processing returns to step S902.

As described above, the present exemplary embodiment implements a second receiving unit by performing the processing in step S904.

On the other hand, if it is determined that the charging destination change request is not detected (NO in step S902), then the processing advances to step S908. In step S908, the verification request receiving unit 708 and the change result receiving unit 709 determine whether data has been received from the management server 104.

If it is determined that data has been received from the management server 104 (YES in step S908), then the processing advances to step S909. In step S909, the verification request receiving unit 708 and the change result receiving unit 709 determine whether the received data is a charging destination change verification request. The charging destination change verification request is sent from the management server 104, if necessary, as a reply to the charging destination change request sent in step S907.

If it is determined that the received data is a charging destination change verification request (YES in step S909), then in step S910, the verification content display unit 703 displays a charging destination change verification UI.

FIG. 10 illustrates an example configuration of a charging destination change verification UI according to the present exemplary embodiment.

In a case where verification is set to be performed before applying a charging destination change, the management server 104 uses the jobs that are extracted by the search on the DB server 103 as change target candidates. Then, the management server 104 adds information indicating the change target candidate jobs to the charging destination change verification request and sends the information to the client terminal apparatus 101.

In FIG. 10, a charging destination change verification UI 1001 displays a document name, a job owner name, a device name, a job start date and time, a charging target, and charging data with respect to each of two jobs extracted as a result of the search over the DB server 103. As described above, the present exemplary embodiment implements a display unit by performing the processing in step S910.

In step S911, the verification content selection unit 704 determines whether an "apply change" button on the charging destination change verification UI 1001 has been pressed by the user.

If it is determined that the "apply change" button on the charging destination change verification UI 1001 has been pressed (YES in step S911), then the verification content selection unit 704 acquires information about the job selected by the user. In step S912, the verification content selection unit 704 generates reply data indicating that a change is to be applied to the job log of the selected job.

As described above, the present exemplary embodiment implements a receiving unit by performing the processing in step S911.

On the other hand, if it is determined that the "apply change" button on the charging destination change verification UI 1001 has not been pressed (NO in step S911), then the processing advances to step S914. In step S914, the verification content selection unit 704 determines whether an "apply no change" button on the charging destination change verification UI 1001 has been pressed by the user.

If it is determined that the "apply no change" button on the charging destination change verification UI 1001 has been pressed (YES in step S914), then the processing advances to step S915. In step S915, the verification content selection unit 704 generates reply data indicating that no change is to be applied. In this case, in the present exemplary embodiment, the management server 104 searches the DB server 103 again, as will be described in more detail below.

On the other hand, if it is determined that the "apply no change" button on the charging destination change verification UI 1001 has not been pressed (NO in step S914), then the processing advances to step S916. In step S916, the verification content selection unit 704 determines whether a cancel button on the charging destination change verification UI 1001 has been pressed by the user.

If it is determined that the cancel button on the charging destination change verification UI 1001 has not been pressed (NO in step S916), then the processing returns to step S902. On the other hand, if it is determined that the cancel button on the charging destination change verification UI 1001 has been pressed (YES in step S916), then the processing advances to step S917. In step S917, the verification content selection unit 704 generates reply data indicating that the change request is to be changed.

In step S913, the change request sending unit 707 sends the reply data generated in steps S912, S915, and S917 to the management server 104. Then, the processing returns to step S902.

On the other hand, if it is determined that no charging destination change verification request has been received (NO in step S909), then the processing advances to step S918. In step S918, the verification request receiving unit 708 and the change result receiving unit 709 determine whether the data received from the management server 104 is a charging destination change result. If it is determined that the data received from the management server 104 is a charging destination change result (YES in step S918), then the processing advances to step S919. In step S919, the change result display unit 702 displays a charging destination change result UI.

FIG. 11 illustrates an example configuration of a charging destination change result UI according to the present exemplary embodiment.

In FIG. 11, a charging destination change result UI 1101 displays a result of applying a charging destination change request. The charging destination change result UI 1101 in FIG. 11 is an example of a screen displayed when the charging destination change has been successfully applied and information about the job whose charging destination is to be changed (change target job) and information about the data on which the change has been applied (change target data) are displayed.

In addition, in a case where no corresponding job has been extracted as a result of the search over the DB server 103 or where the user has entered wrong data, the management server 104 sends error information indicating a cause of the error. Accordingly, in such a case, the change result display unit 702 displays a charging destination change result UI including the error information.

In the present exemplary embodiment, the charging destination change result UI 1101 is displayed as a native UI of the client. However, the present invention is not limited to this exemplary embodiment. That is, the charging destination change result can be notified by an e-mail for example.

In the case where the charging destination change result is notified by an e-mail, an e-mail address of a person having requested the charging destination change is previously registered on the management server 104. Alternatively, in this case, a reply destination is previously designated in the charging destination change request. Thus, the management server 104 can identify an e-mail address of a destination to be notified of the charging destination change result. As described above, in the present exemplary embodiment, a notification unit can be implemented by performing the processing in step S919 with the charging destination change result UI 1101 based on the change result information.

In step S920, the change result display unit 702 determines whether an OK button on the charging destination change result UI 1101 has been pressed by the user.

If it is determined that the OK button on the charging destination change result UI 1101 has not been pressed (NO in step S920), then the CPU 200 waits until the OK button is pressed. On the other hand, if it is determined that the OK button on the charging destination change result UI 1101 has been pressed (YES in step S920), then the processing returns to step S902.

Figure 12A:
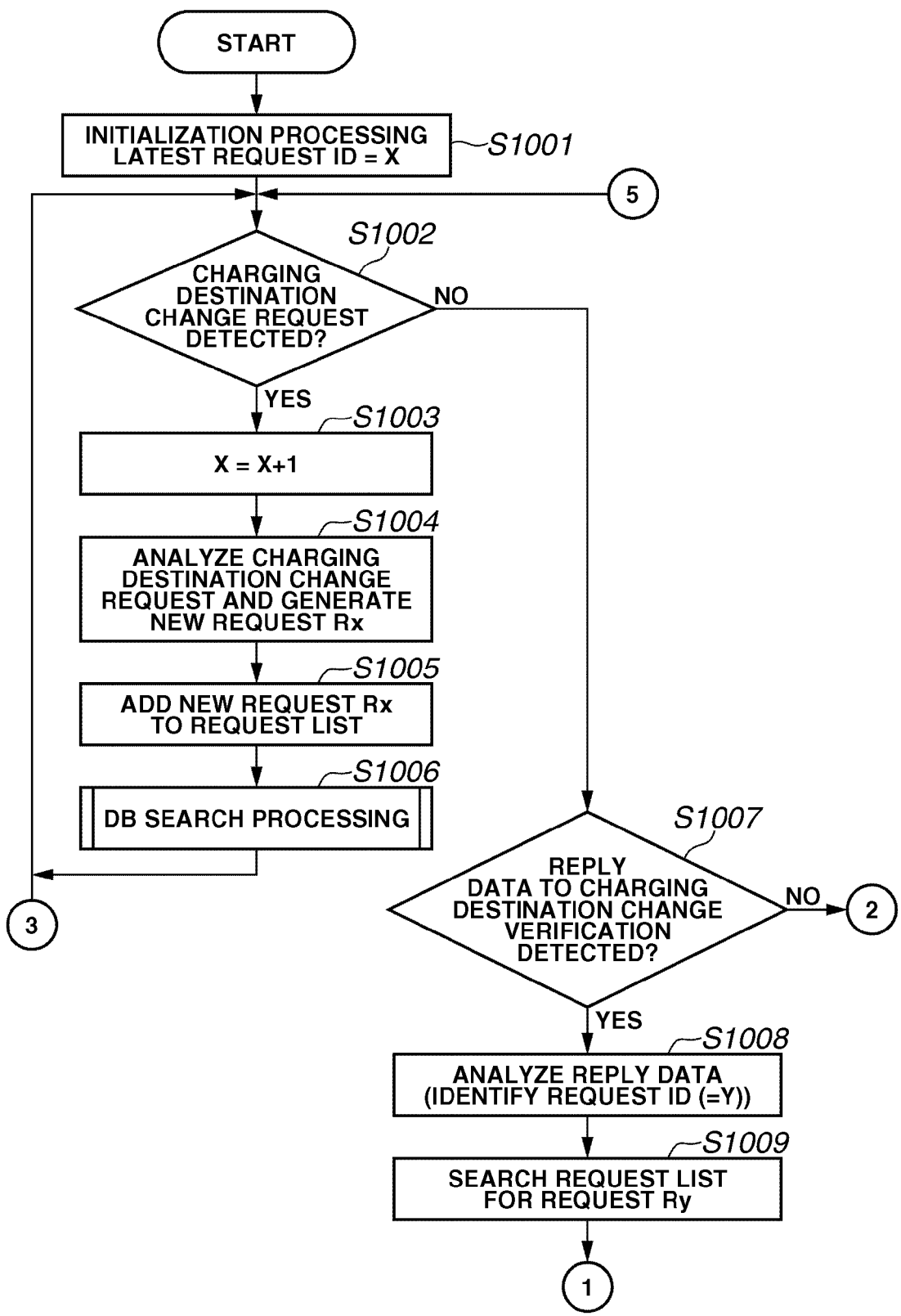
FIG. 12A is a flow chart illustrating an example of processing performed by a server program included in the job log management program according to the first exemplary embodiment of the present invention.
Figure 12C:
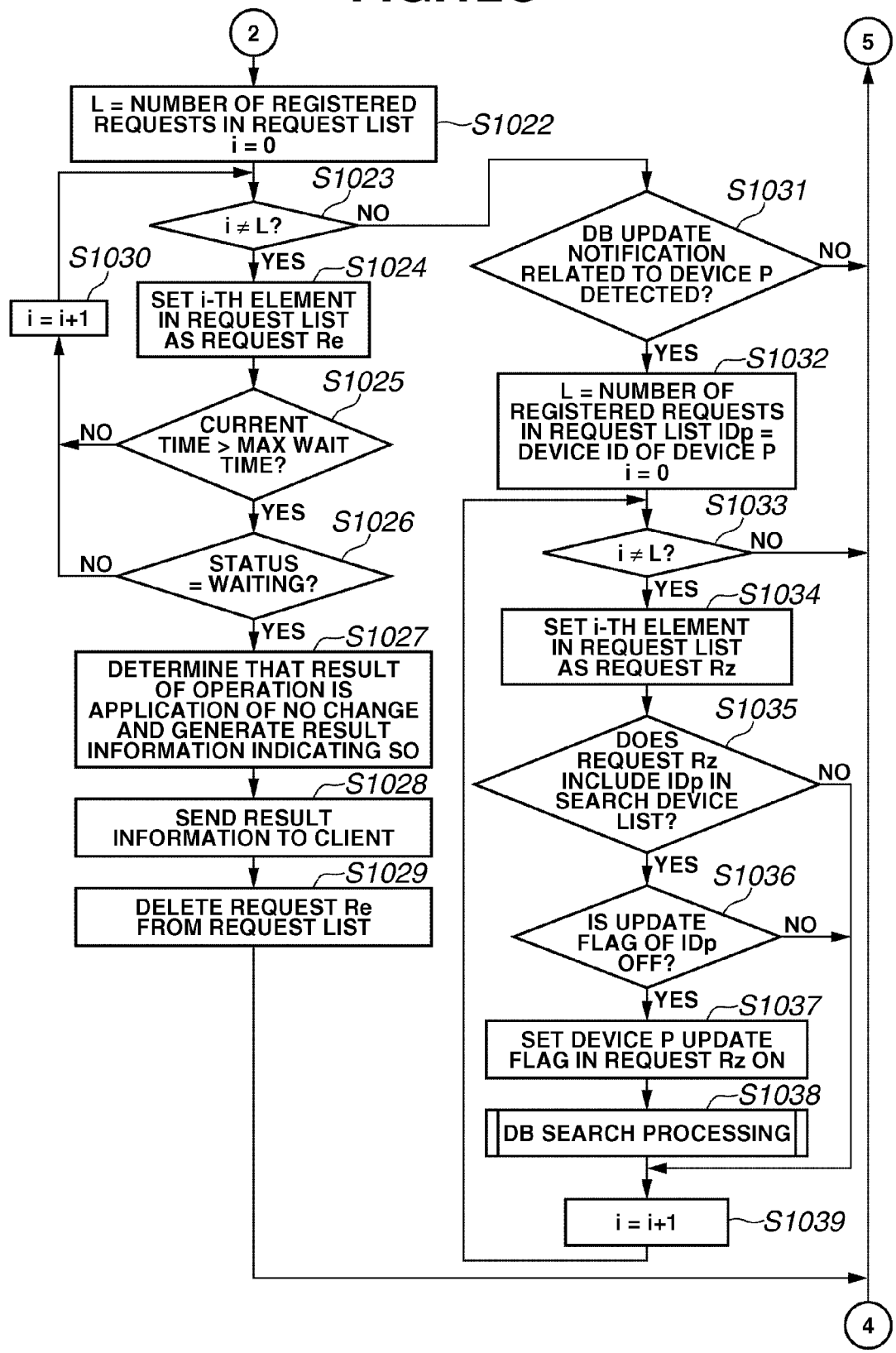
FIG. 12C is a flow chart illustrating processing continued from the processing in the flow chart of FIG. 12A according to the first exemplary embodiment of the present invention.

An example of processing performed by the management server 104 will be described below with reference to FIGS. 12A through 12C. Each of FIGS. 12A through 12C is a flow chart illustrating an example of processing performed by the server program included in the job log management program 403. The server program operates on the management server 104.

Referring to FIG. 12A, in step S1001, the management server 104 performs initialization processing necessary for initializing (starting) the job log management program 403. In step S1002, the change request receiving unit 712 determines whether a charging destination change request has been received from the client terminal apparatus 101.

If it is determined that a charging destination change request received from the client terminal apparatus 101 is detected (YES in step S1002), then the CPU 200 of the management server 104 generates a request class instance. Thus, a sequential request identification (ID) unique to an instance is provided to each instance. Here, the CPU 200 stores a last-provided value (a last request ID) X. The request ID is incremented by one every time a new request ID is provided.

FIGS. 13A and 13B illustrate an example of a member included in a request class instance, according to the present exemplary embodiment.

Referring to FIG. 13A, a request ID member is used to uniquely identify a charging destination change request. A status member is used to manage a status of processing on the charging destination change request. More specifically, a status member is used to manage at least three statuses, namely, "new" (generating a new request), "waiting" (waiting for updating the DB in the DB server 103), and "reply_waiting" (waiting for a reply from the client terminal apparatus 101).

A replyCount member is used to manage a number of verification requests yet to be replied from the client terminal apparatus 101. Every time a charging destination change verification request is sent to the client terminal apparatus 101, the value for the replyCount member is incremented. On the other hand, every time reply data is received from the client terminal apparatus 101, the value for the replyCount member is decremented.

A MaxWaitTime member is used to manage the maximum wait time of the processing (a maximum wait time in the DB search waiting unit 716). In the present exemplary embodiment, the maximum wait time is utilized in checking whether the charging destination change request is timed out. However, under an environment in which the management server 104 cannot acquire a notification of update of the DB server 103, the maximum wait time can be utilized as the time for searching the DB server 103 again.

In addition to the members described above, referring to FIG. 13B, the present exemplary embodiment uses a member relating to job information for identifying the original job whose job log is to be changed (for identifying the client-designated change target job), which has been designated by the user via the client terminal apparatus 101. Furthermore, the present exemplary embodiment uses a member relating to change target data whose charging destination is to be changed, which has been designated by the user via the client terminal apparatus 101 (client-designated charging destination change target data).

A search device list includes, per device to be searched based on a charging destination change request, device search information DevSearchInfo (=DeviceID, updateFlag, and result). Thus, the management server 104 can manage the device to be searched, a designation as to whether to perform a search, and a search result.

For example, if a number of devices to be searched based on a charging destination change request is one, then one "DevSearchInfo" is stored in the search device list. If the number of devices to be searched based on a charging destination change request is ten, then ten "DevSearchInfo" are stored in the search device list. The update flag (updateFlag) is initialized when it is "OFF" (=0), and when updated, the updateFlag is set "ON" (=1).

The search result "result" is initialized when it is set at "0". Only when the search is not successfully performed, a value "FAILURE" (=−1) is set. Hereinafter, the request class instance described above is simply referred to as a "request", as necessary.

Returning to FIG. 12A, if it is determined that a charging destination change request is detected (YES in step S1002), in step S1003, the DB search unit 717 provides a new request ID. That is, the DB search unit 717 increments the last-provided value X by one.

In step S1004, the DB search unit 717 analyzes the charging destination change request, extracts the value, and generates a new request Rx. A value "new" (newly generated request) is set for the initial status ("status") of the new request Rx. Furthermore, in step S1004, the DB search unit 717 sets the value "0" for the replyCount member which stores the number of verification request that has been yet to be replied among the verification requests to the client terminal apparatus 101.

In step S1005, the DB search unit 717 registers the new request Rx to a request list. The request list is a list registering a request that is currently processed. The request list is utilized for managing requests.

Figure 14:
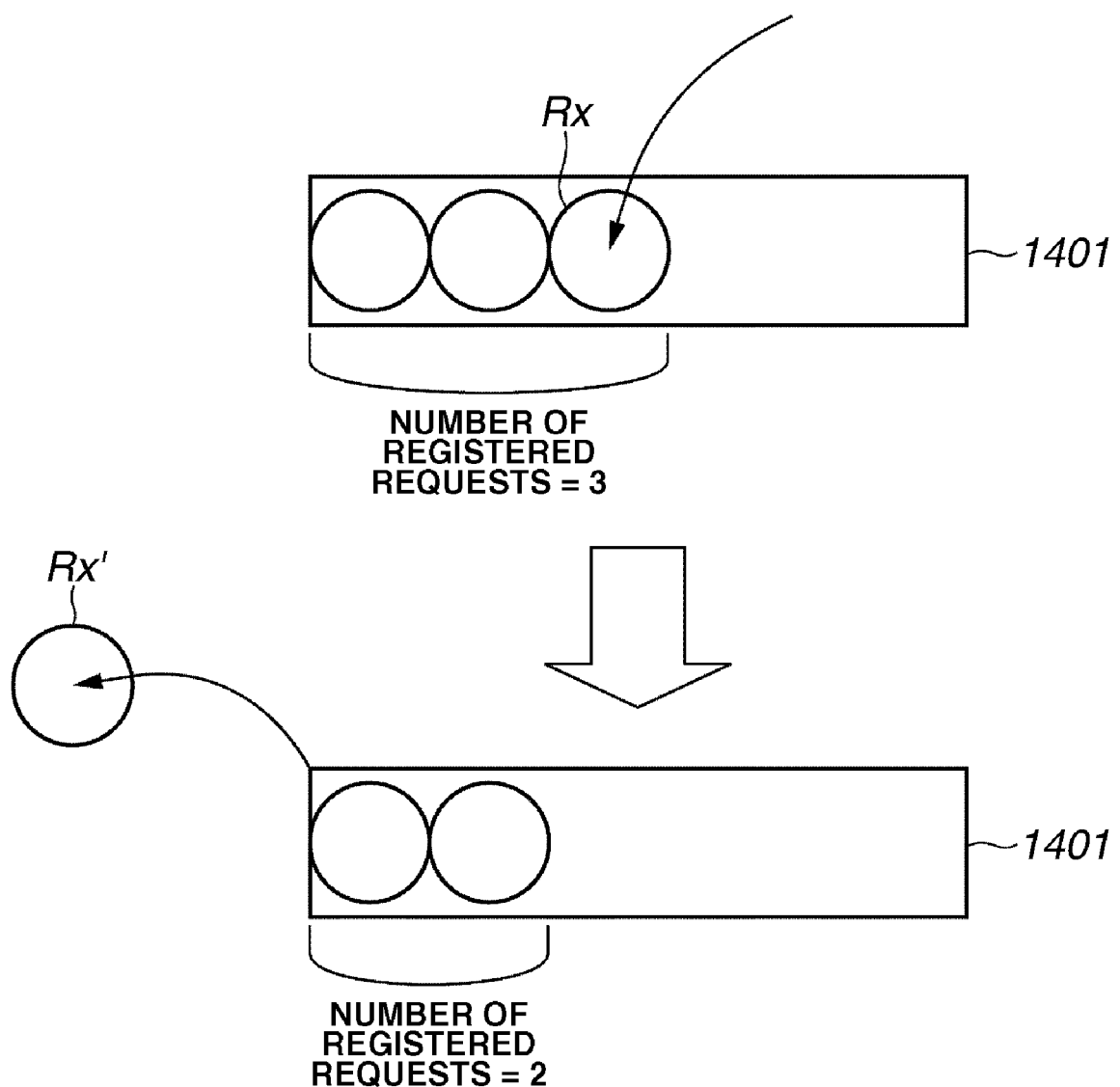
FIG. 14 illustrates an example of a method for registering a new request to a request list, according to the first exemplary embodiment of the present invention.

FIG. 14 illustrates an example of a method for registering a new request Rx to the request list according to the present exemplary embodiment.

Referring to FIG. 14, the request Rx, which has been newly generated in step S1004 (FIG. 12A) is registered to a request list 1401 in step S1005 (FIG. 12A). Furthermore, as will be described in detail below, the CPU 200 sends a result of the processing performed based on the charging destination change request to the client terminal apparatus 101 and then deletes a processed request Rx' from the request list 1401.

Returning to FIG. 12A, in step S1006, the DB search unit 717 performs DB search processing based on the new request Rx. The DB search processing will be described in detail below with reference to FIGS. 15A and 15B. The present exemplary embodiment implements a search unit by performing the processing in step S1006.

On the other hand, if it is determined that no charging destination change request is detected (NO in step S1002), then the processing advances to step S1007. In step S1007, the change request receiving unit 712 determines whether reply data to the charging destination change verification request is detected.

If it is determined that reply data to the charging destination change verification request is detected (YES in step S1007), then in step S1008, the DB changing unit 718 analyzes the reply data and identifies the request ID. Here, it is assumed that the request ID identified in step S1008 is "Y".

In step S1009, the DB changing unit 718 search the request list 1401 for a request Ry whose request ID is Y.

Referring to FIG. 12B, in step S1010, the DB changing unit 718 determines whether the reply data detected in step S1007 is designated to apply the change.

If it is determined that it is designated to apply the change (YES in step S1010), then in step S1011, the DB changing unit 718 generates a change expression (for example, a structured query language (SQL) statement) for applying the change in the contents registered in the DB server 103.

In step S1012, the DB changing unit 718, using the generated SQL statement, applies the change to the DB in the DB server 103. As described above, the present exemplary embodiment implements a changing unit by performing the processing in step S1012.

In step S1013, the DB update notification generation unit 719 generates result information (the above-described DB update notification) to be notified to the client terminal apparatuses 101 and 102 (client terminals) based on the result of the processing in step S1012.

In step S1016, the processing result sending unit 714 sends the result information (DB update notification) generated in step S1013 to an appropriate corresponding client (the client terminal apparatuses 101 and 102). In step S1017, the DB changing unit 718 deletes the request Ry from the request list 1401. Then, the processing returns to step S1002 (FIG. 12A).

On the other hand, if it is determined that it is not designated to apply the change (NO in step S1010, FIG. 12B), then in step S1014, the DB changing unit 718 determines whether the reply data detected in step S1007 includes a designation for canceling the change request.

If it is determined that it is designated to cancel the change request (YES in step S1014), then the processing advances to step S1015. In step S1015, the DB update notification generation unit 719 cancels the processing result and generates result information.

In step S1016, the processing result sending unit 714 sends the result information generated in step S1015 to an appropriate corresponding client (the client terminal apparatuses 101 and 102). In step S1017, the DB changing unit 718 deletes the request Ry from the request list 1401. Then, the processing returns to step S1002 (FIG. 12A).

On the other hand, if it is determined that it is not designated to cancel the change request (NO in step S1014), then the processing advances to step S1018. In step S1018, the DB changing unit 718 determines whether the reply data detected in step S1007 (FIG. 12A) includes a designation for applying no change. More specifically, in step S1018 (FIG. 12B), the DB changing unit 718 determines whether the user has verified that the search result does not include a job whose charging destination is to be changed. If it is determined that it is designated to apply no change (YES in step S1018), then in step S1019, the DB changing unit 718 increments the reply-Count member by one.

In step S1020, the DB changing unit 718 determines whether the value for the replyCount member is 0. If it is determined that the value for the replyCount member is 0 (YES in step S1020), then in step S1021, the DB changing unit 718 performs the following processing.

That is, in step S1021, the DB changing unit 718 changes the status (status attribute) of the request R from "reply_waiting" (a status of waiting for a reply from the client) to "waiting" (a status of waiting for a search after a DB update). Then, the processing returns to step S1002 (FIG. 12A). On the other hand, if it is determined that the value for the replyCount member is not 0 (NO in step S1020), then the CPU 200 skips the processing in step S1021 and returns to step S1002 (FIG. 12A).

If it is determined that reply data to the charging destination change verification request has not been detected (NO in step S1007, FIG. 12A), then the processing advances to step S1022 (FIG. 12C). In step S1022, the DB update notification generation unit 719 checks all the requests in the request list 1401 serially from a first request, initializes a variable L with the number of registered requests stored in the request list 1401 to verify whether a timed-out request exists (check for a time out), and initializes an index variable i with a value 0 (i=0). The index variable i is used for evaluating all the requests in the request list 1401. A first request in the request list 1401 is assumed as a zeroth request.

In step S1023, the DB update notification generation unit 719 determines whether the index variable i is not equal to the variable L. If it is determined that the index variable i is equal to the variable L (NO in step S1023), that is, if all the requests in the request list 1401 have been completely evaluated, then the processing advances to step S1031.

On the other hand, if it is determined the index variable i is not equal to the variable (YES in step S1023), that is, if all the requests in the request list 1401 have not been completely evaluated, then the processing advances to step S1024. In step S1024, the DB update notification generation unit 719 sets an i-th request in the request list 1401 as a request Re.

In step S1025, the DB update notification generation unit 719 acquires the current time, compares the acquired current time with the MaxWaitTime member (the maximum wait time) for the request Re and check for a time out. That is, the DB update notification generation unit 719 determines whether the current time has passed the MaxWaitTime member (the maximum wait time) for the request Re.

If it is determined that a time out has occurred (YES in step S1025), then in step S1026, the DB update notification generation unit 719 determines whether the status member in the request Re has a value "waiting".

If it is determined that no time out has been detected (NO in step S1025) and if the status member in the request Re does not have a value "waiting" (NO in step S1026), then, the processing advances to step S1030. In step S1030, the DB update notification generation unit 719 increments the index variable i by one. Then, the processing returns to step S1023.

On the other hand, if it is determined that the status member in the request Re has a value "waiting" (YES in step S1026), then in step S1027, the DB update notification generation unit 719 determines that the processing result is "apply no change" to process the request as a time-out request and generates result information. In step S1028, the processing result sending unit 714 sends the result information to the corresponding client (the client terminal apparatuses 101 and 102).

In step S1029, the DB changing unit 718 deletes the request Re from the request list 1401. Then, the processing returns to step S1002 (FIG. 12A).

On the other hand, if it is determined that the index variable i is equal to the variable L (NO in step S1023), then the processing advances to step S1031. In step S1031, the DB search unit 717 determines whether a DB update notification for a device P has been detected. If it is determined that no DB update notification for a device P has been detected (NO in step S1031), then the processing returns to step S1002 (FIG. 12).

On the other hand, if it is determined that a DB update notification for a device P has been detected (YES in step S1023), then in step S1032, the DB search unit 717 initializes the variable L with the number of requests registered in the request list 1401 and also initializes the index variable i with the value 0 (i=0).

Furthermore, in step S1032, the DB search unit 717 acquires a device ID for the device P (IDp). The index variable i is used for evaluating all the requests in the request list 1401. A first request in the request list 1401 is assumed as a zeroth request.

In step S1033, the DB search unit 717 determines whether the index variable i is not equal to the variable L.

If it is determined that the index variable i is equal to the variable L (NO in step S1033), that is, if all the requests in the request list 1401 have been completely evaluated, then the processing returns to step S1002 (FIG. 12A). On the other hand, if it is determined that the index variable i is not equal to the variable L (YES in step S1033), that is, if all the requests in the request list 1401 have not been completely evaluated, then the processing advances to step S1034. In step S1034, the DB search unit 717 sets an i-th request in the request list 1401 as a request Rz.

In step S1035, the DB search unit 717 determines whether a DevSearchInfo member whose DeviceID is "IDp" (DeviceID=IDp) is included in the search device list for the request Rz.

If it is determined that no DevSearchInfo is included in the search device list for the request Rz (NO in step S1035), then the CPU 200 skips the processing in steps S1036 through S1038 and advances processing to step S1039. On the other hand, if it is determined that a DevSearchInfo member is included in the search device list for the request Rz (YES in step S1035), then in step S1036, the DB search unit 717 determines whether an updateFlag member (Infop→updateFlag) in the DevSearchInfo (Infop) member whose DeviceID is IDp is OFF.

If it is determined that the updateFlag member in the DevSearchInfo member whose DeviceID is IDp is not OFF (NO in step S1036), then the CPU 200 skips the processing in steps S1037 and S1038 and advances processing to step S1039.

On the other hand, if it is determined that the updateFlag member in the DevSearchInfo member whose DeviceID is IDp is OFF (YES in step S1036), then the CPU 200 determines that information stored on the DB server 103 after a first search has not been searched with respect to the device P and that it is necessary to search the DB server 103 and processing advances to step S1037. In step S1037, the DB search unit 717 sets the updateFlag member (Infop→updateFlag) ON.

In step S1038, the DB search unit 717 performs the DB search processing with respect to the request Rz and the device P. The DB search processing will be described in detail below with reference to FIGS. 15A and 15B. As described above, the present exemplary embodiment implements a re-searching unit by performing the processing in step S1038.

In step S1039, the DB search unit 717 increments the index variable i by one and then the processing returns to step S1033.

Figure 15A:
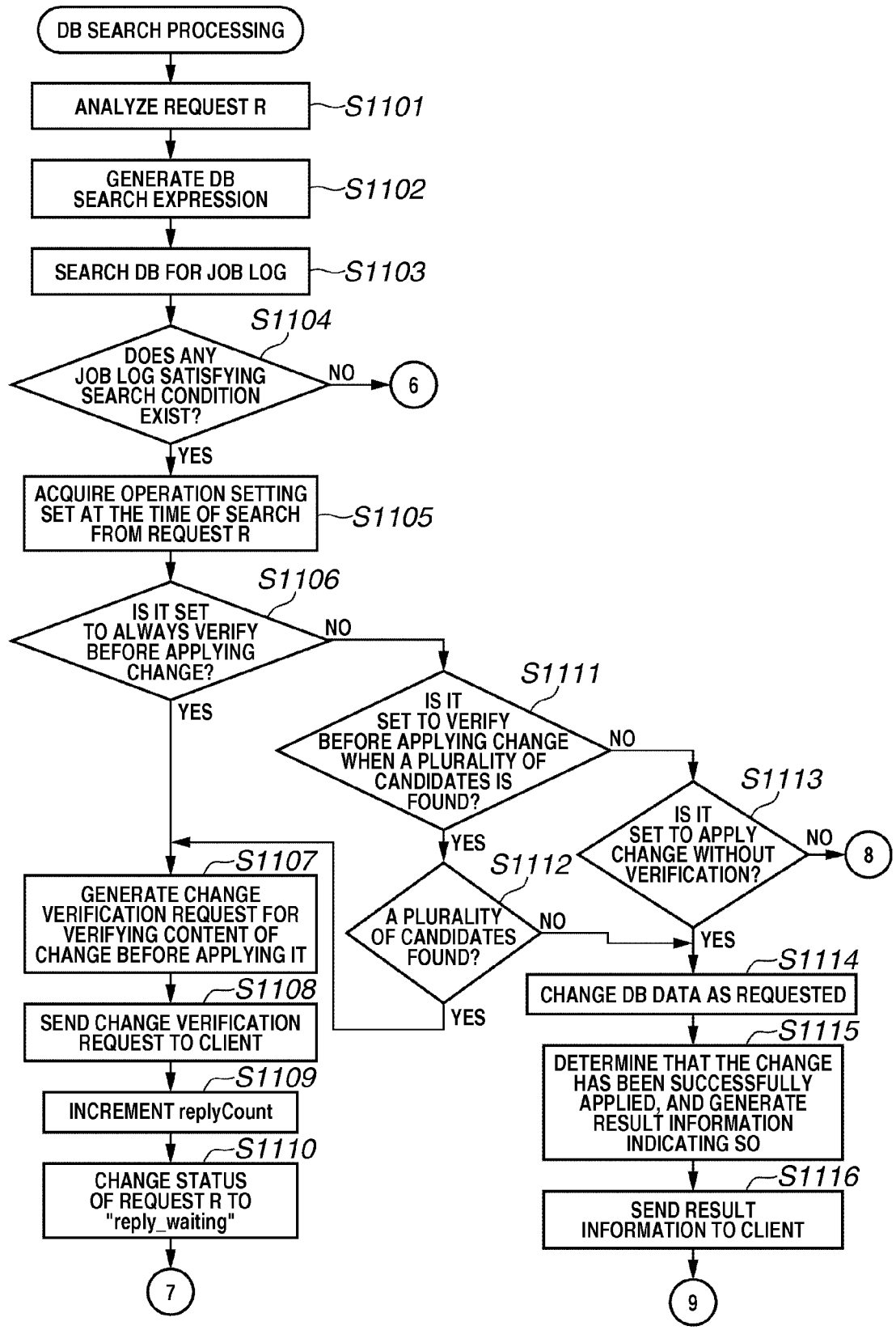
FIG. 15A is a flow chart illustrating an example of DB search processing performed for a request according to the first exemplary embodiment of the present invention.

FIGS. 15A and 15B are flow charts each illustrating an example of the DB search processing performed for the request R, according to the present exemplary embodiment.

Referring to FIG. 15A, in step S1101, the DB search unit 717 analyzes the request R and extracts the condition for the job (job search condition) designated by the user. Here, if the device P is identified in the request R as in the case of the processing in step S1038, the CPU 200 sets an argument D for the processing as the DeviceID for the corresponding device.

On the other hand, if the device P is not identified in the request as in the case of the processing in step S1006, the argument D is set at "0" (D=0). If the argument D is not 0, the CPU 200 can identify the condition related to the device included in the job search condition as "D" regardless of the device identified in the request R.

Here, the job search condition is a value designated by the user with respect to job attributes such as the job type, the job owner name, the job performing date and time, the document name, the device name, the device address, the charging user name, the charging group name, and the billing code. The job attributes are stored as a column name (the job log) in a search table in the DB server 103.

In step S1102, the DB search unit 717 generates a search expression (in an SQL statement (DB language), a "SELECT" statement) for searching the DB server 103 based on the data extracted in step S1101. The search expression is a publicly known common art and does not constitute an essential part of the present invention. Accordingly, the search expression will not be described in detail here.

In step S1103, the DB search unit 717 search the DB server 103 for a job log that match the search condition using the search expression generated in step S1102. In step S1104, the DB search unit 717 determines whether a job log that satisfies the search condition exists.

If it is determined that a job log that satisfies the search condition exists (YES in step S1104), then in step S1105, the DB search unit 717 acquires the operation setting for the search from the request R.

In the present exemplary embodiment, each user can designate the operation settings, as described above. However, in the case where the operation settings are unique to the system, the CPU 200 does not acquire the operation settings, every time the CPU 200 receives a request R but acquires the settings at the time of initializing the system.

In step S1106, the DB search unit 717 determines whether the operation setting acquired in step S1105 includes a designation for always performing verification before applying a change. If it is determined that the operation setting acquired in step S1105 does not include a designation for always performing a verification before applying a change (NO in step S1106), then the processing advances to step S1111. In step S1111, the DB search unit 717 determines whether the operation setting acquired in step S1105 includes a designation for performing verification before applying a change in the case where a plurality of candidates exists.

If it is determined that the operation setting acquired in step S1105 includes a designation for performing a verification before applying a change in the case where a plurality of candidates exists (YES in step S1111), then the processing advances to step S1112. In step S1112, the DB search unit 717 determines whether a plurality of candidates exists. If it is determined that a plurality of candidates does not exist (NO in step S1112), then the processing advances to step S1114.

If it is determined that the operation setting acquired in step S1105 includes a designation for always performing a verification before applying a change (YES in step S1106), or if it is determined that a plurality of candidates exists (YES in step S1112), then the processing advances to step S1107. In step S1107, the DB search unit 717 generates a change verification request to perform verification before applying a change. In step S1108, the verification request sending unit 713 sends the change verification request generated in step S1107 to the corresponding client terminal (the client terminal apparatuses 101 and 102).

In step S1109, the DB search unit 717 increments the replyCount member. In step S1110, the DB search unit 717 changes the status member in the request R to "reply_waiting". Then, the CPU 200 ends the DB search processing and returns to the processing in the flow chart of FIGS. 12A through 12C.

On the other hand, if it is determined that the operation setting acquired in step S1105 does not include a designation for performing a verification before applying the change in a case where a plurality of candidates exists (NO in step S1111), then the processing advances to step S1113. In step S1113, the DB search unit 717 determines whether the operation setting acquired in step S1105 includes a designation for changing the charging destination without performing verification before applying the change. If it is determined that the operation setting acquired in step S1105 does not include a designation for changing the charging destination without performing a verification before applying the change (NO in step S1113), then the processing advances to step S1118.

On the other hand, if it is determined that the operation setting acquired in step S1105 includes a designation for changing the charging destination without performing a verification before applying the change (YES in step S1113), then the processing advances to step S1114. In step S1114, the DB changing unit 718 changes the data stored on the DB server 103 as requested. In the case of using a SQL statement, the DB changing unit 718 generates an "UPDATE" statement and performs the processing in step S1114. The processing for generating an "UPDATE" statement is a common art and does not constitute an essential part of the present invention. Accordingly, a detailed description thereof will not be made here.

In step S1115, the DB update notification generation unit 719 determines that the change has been successfully applied and generates result information (the above-described DB update notification) indicating the successful result. In step S1116, the processing result sending unit 714 sends the result information generated in step S1115 to the corresponding client terminal (the client terminal apparatuses 101 and 102). Then, the processing advances to step S1120.

On the other hand, if it is determined in step S1104 that a job log that satisfies the search condition does not exist (NO in step S1104), then the processing advances to step S1117 (FIG. 15B). In step S1117, the DB search unit 717 determines whether the request R is invalid due to an error in designating data. If it is determined that the request R is invalid due to an error (YES in step S1117), then the processing advances to step S1118. In step S1118, the DB update notification generation unit 719 generates appropriate error information as a reply to the charging destination change request. In step S1119, the processing result sending unit 714 sends the error information generated in step S1118 to the corresponding client terminal (the client terminal apparatuses 101 and 102).

In step S1120, the DB search unit 717 deletes the request R from the request list 1401. Then, the CPU 200 ends the DB search processing and returns to the processing in the flow chart of FIGS. 12A through 12C.

On the other hand, if it is determined that the request R is not invalid due to an error (NO in step S1117), then the processing advances to step S1121. In step S1121, the DB search unit 717 determines whether the status member in the request R is "new". If it is determined in step S1121 that the status member in the request R is "new" (YES in step S1121), then in step S1122, the DB search unit 717 determines whether the user designates a device in the request R.

If it is determined that a device is designated by the user in the request R (YES in step S1122), then the processing advances to step S1123. In step S1123, the wait time determination unit 720 sets a job log acquisition enabling time for the designated device, as MaxWaitTime member (maximum wait time) in the request R.

The job log acquisition enabling time is managed by a module related to acquisition and receiving of a job log such as the job log storage unit 715. The wait time determination unit 720 issues an inquiry to the module to acquire the job log acquisition enabling time. For the job log acquisition enabling time, a time can be used at which the DB search waiting unit 716 acquires the DB update notification indicating that the job log of the device designated in the request R has been updated in the DB server 103.

Then, the DB search unit 717 generates one DevSearchInfo member. The DevSearchInfo member includes the DeviceID of the designated device. In the DevSearchInfo member, the updateFlag is initialized with the value "OFF" and the result is initialized with the value "0".

In step S1124, the DB search unit 717 registers the generated device search information (DevSearchInfo) in the search device list which is a member in the request R. In step S1125, the DB search unit 717 changes the status member in the request R to "waiting" and waits for a DB update. Then, the CPU 200 ends the DB search processing and returns to the processing in the flow chart of FIGS. 12A through 12C.

On the other hand, if it is determined that no device has been designated in the request R (NO in step S1122), then the processing advances to step S1126. In step S1126, the wait time determination unit 720 sets the job log acquisition enabling time as the MaxWaitTime member (maximum wait time) of the request R in the following manner.

The job log acquisition enabling time is managed by a module related to acquisition and receiving of a job log such as the job log storage unit 715, as described above. The wait time determination unit 720 issues an inquiry to the module to acquire the job log acquisition enabling time. Then, the wait time determination unit 720 sets the job log acquisition enabling time by adding the time taken to update the job log in the DB server 103 to the latest one in the job log acquisition enabling times for all the devices managed by the management server 104.

However, the job log acquisition enabling time set in step S1126 is not limited to this exemplary embodiment. For example, in a case where the DB search unit 717 receives the DB update notification indicating that the job log of the device has been updated in the DB server 103 and where the management server 104 stores the device information in the DB update notification, the time at which the device information for all the devices is stored can be used as the job log acquisition enabling time.

Then, the DB search unit 717 generates the above-described DevSearchInfo for all the devices. The DevSearchInfo member includes the DeviceID of the designated device. In the DevSearchInfo member, the updateFlag is initialized with the value "OFF" and the result is initialized with the value "0". In step S1127, the DB search unit 717 registers all the generated DevSearchInfo in the search device list which is a member in the request R. Then, the processing advances to step S1125. In step S1125, the DB search unit 717 changes the status member in the request R to "waiting" and waits for a DB update. Then, the CPU 200 ends the DB search processing and returns to the processing in the flow chart of FIGS. 12A through 12C.

On the other hand, if it is determined that the status member in the request R is not "new" (NO in step S1121), then the processing advances to step S1128. In step S1128, the DB search unit 717 searches the search device list which is a member in the request R for a DevSearchInfo member whose DeviceID is "D" and sets the result ("result") of the search as "FAILURE" (−1).

In step S1129, the DB search unit 717 determines whether the request by the request R is finally fixed as a failure. More specifically, the DB search unit 717 checks all the members in the search device list, and determines that the request by the request R is finally fixed as the failure if the result member has a value "FAILURE" with respect to all the DevSearchInfo members.

If it is determined that the request by the request R is finally fixed as the failure (YES in step S1129), then the processing advances to step S1130. In step S1130, the DB update notification generation unit 719 determines that the result of the processing is "apply no change" and generates error information. Then, the processing advances to step S1119. In step S1119, the processing result sending unit 714 sends the error information generated in step S1130 to the corresponding client terminal (the client terminal apparatuses 101 and 102).

On the other hand, if it is determined that the request by the request R is not fixed as the failure (NO in step S1129), then the CPU 200 ends the DB search processing in order to wait for an update of the DB server 103 and a second search for another device, and then returns to the processing in the flow chart of FIGS. 12A through 12C.

As described above, in the present exemplary embodiment, when a user designates a job search condition for changing the charging destination via the charging destination change request UI 901, the client terminal apparatuses 101 and 102 send a charging destination change request to the management server 104, according to the designated search condition.

After receiving the charging destination change request, the management server 104 waits until a job log of the corresponding jog can be acquired, changes the information about the charging destination in the acquired job log, and sends a result of the change to the user (the client terminal apparatuses 101 and 102). Thus, even in a case where the database (the DB server 103) does not include a job log of the corresponding job, the user can issue a job log (the charging destination information and the counting target information) change request.

Accordingly, the user can change a job log at a most appropriate timing that the user desires, and the present exemplary embodiment can suppress the occurrence of a case where the user forgets to perform the necessary operation. Thus, the present exemplary embodiment can improve the convenience of the user.

In the present exemplary embodiment, the user sets change target data in the job log via the charging destination change request UI 901. However, the present exemplary embodiment is not limited to this exemplary embodiment. For example, the change target data in the job log can be set in such a manner that when the job log whose charging destination is to be changed is selected by the user in the charging destination change verification UI 1001, a UI for setting the change target data in the job log is displayed, and the change target data in the job log is set according to the user operation via the UI.

Furthermore, the management server 104 can perform the following processing. The management server 104 acquires a latest job log acquisition date and time from all devices that the management server 104 manages (namely, the job log collection units 710, 723, and 724) (a third acquisition unit).

In a case where the charging destination change request includes device information for identifying a device, such as a device name or a device address, and the job performing date and time, the management server 104 can perform the following processing.

That is, the management server 104 compares the latest job log acquisition date and time in the device identified by the device information with the job performing date and time. Then, the management server 104 determines whether the job log of the device has been acquired based on the comparison result (a second determination unit). If it is determined that no job log of the device has been acquired, the management server 104 does not perform a first search and determines that no corresponding job has been extracted.

In the present exemplary embodiment, the user can determine whether to display the charging destination change verification UI 1001 by using the charging destination change request UI 901. However, the present exemplary embodiment is not limited to this method. For example, whether to display the charging destination change verification UI 1001 can be previously set by the system.

Furthermore, in the case where the charging destination change verification UI 1001 is not displayed and if a plurality of job logs is extracted, the user can issue a designation for performing all the job logs and ending the processing without performing any job log, or for performing a portion of each job log.

Second Exemplary Embodiment

A second exemplary embodiment of the present invention will be described below. In the first exemplary embodiment, the management server 104 waits to perform processing according to a charging destination change request (or a counting target change request) until the management server 104 acquires a job log from the device (the MFP 105 and the network printer 106*b*) or from the client terminal apparatuses 101 and 102. Furthermore, the management server 104 searches the DB server 103 again at the timing at which the DB server 103 is updated.

However, according to device characteristics, the operation of the entire charging/counting system may not be affected when the management server 104 acquires a latest job log from the device at the timing of receiving a charging destination change request (or a counting target change request). Moreover, in some cases, the priority of performing the charging destination change request (or a counting target change request) may be higher.

In this regard, in the present exemplary embodiment, the management server 104 compulsorily acquires a latest job log from the device at the timing of receiving a charging destination change request (or a counting target change request). Here, the description as to the units and portions similar to the first exemplary embodiment will not be repeated. In the present exemplary embodiment, as in the first exemplary embodiment, the description will be made as to the charging processing and the description as to counting will not be given.

Figure 16:
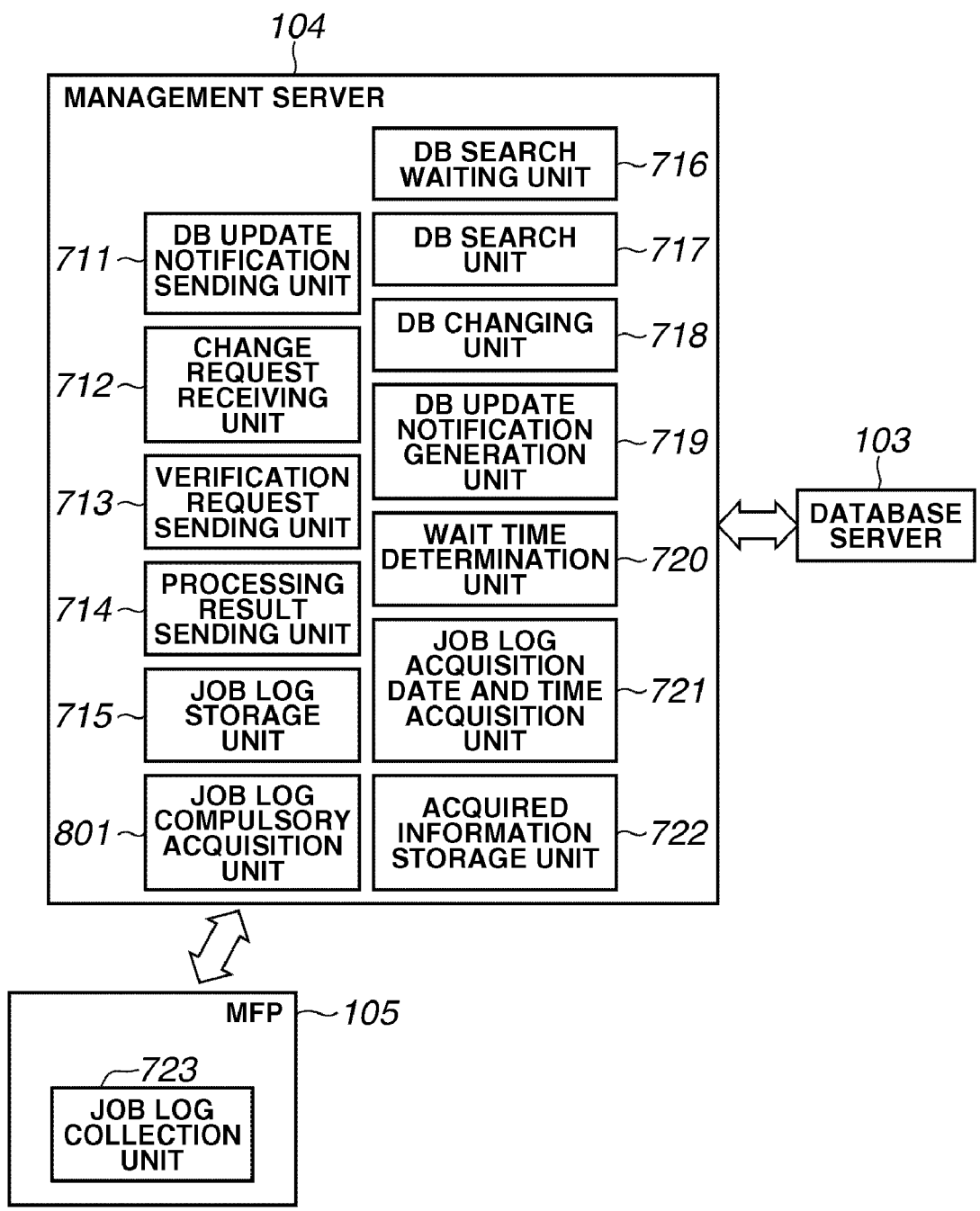
FIG. 16 illustrates an example configuration of a management server according to a second exemplary embodiment of the present invention.

FIG. 16 illustrates an example configuration of the management server 104 according to the present exemplary embodiment.

The management server 104 according to the present exemplary embodiment has a job log compulsory acquisition unit 801, in addition to the components illustrated in FIG. 7 in the first exemplary embodiment. The job log compulsory acquisition unit 801 sends a job log sending request to the client terminal apparatuses 101 and 102, the MFP 105, and the network printer 106*b* after the management server 104 (the change request receiving unit 712) receives a charging destination change request.

For example, when the job log collection unit 723 of the MFP 105 receives a job log sending request from the management server 104, the job log collection unit 723 sends a latest job log to the job log storage unit 715 of the management server 104. The job log storage unit 715 stores the acquired latest job log in the DB server 103. When the DB search unit 717 detects that the latest job log is stored in the DB server 103, the DB search unit 717 starts a search again.

Figure 17:
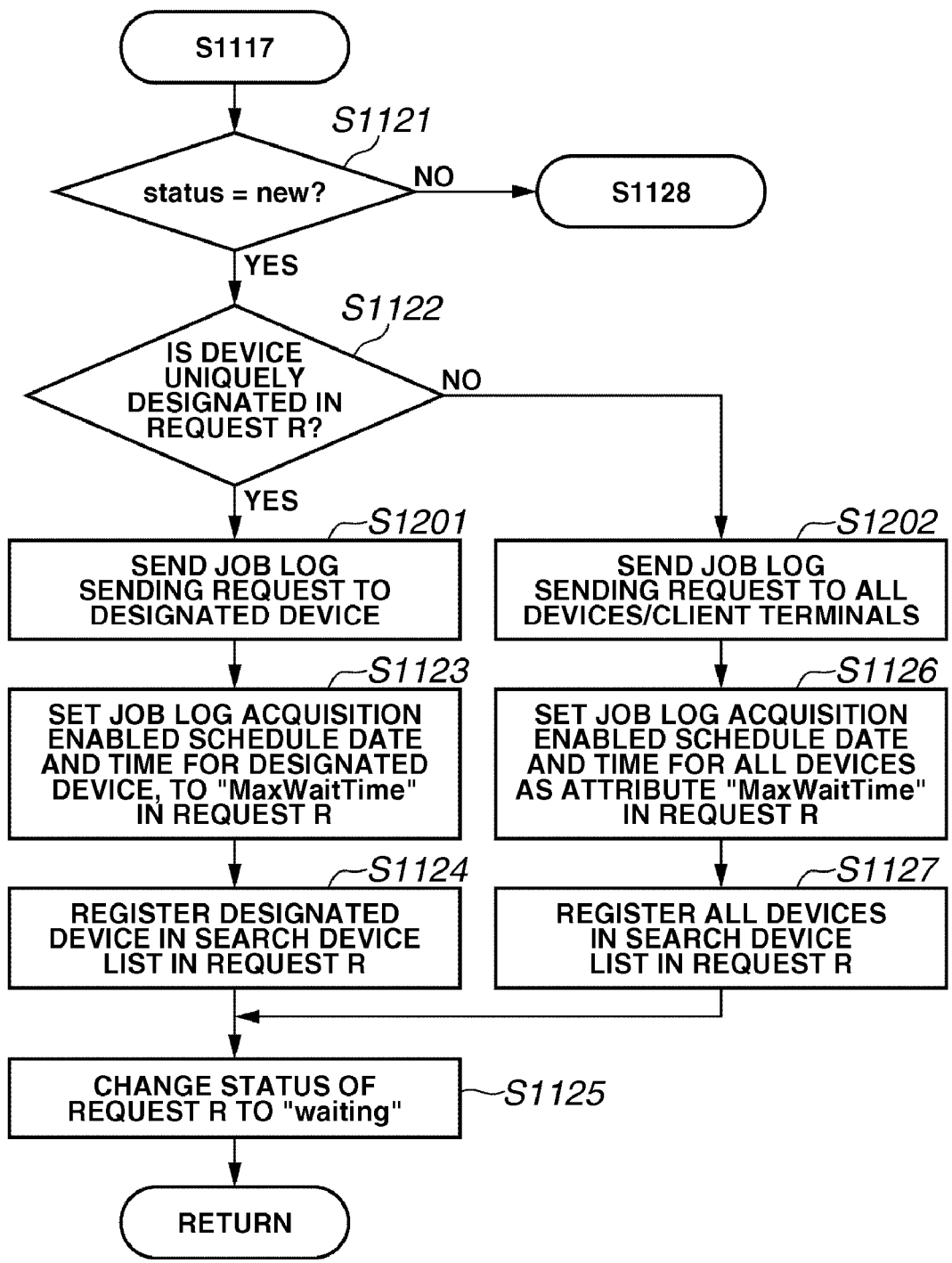
FIG. 17 is a flow chart illustrating an example of DB search processing according to the second exemplary embodiment of the present invention.

FIG. 17 is a flow chart illustrating an example of the DB search processing according to the present exemplary embodiment. FIG. 17 illustrates a part of the DB search processing in FIG. 15 only and the other parts thereof are omitted in FIG. 17.

The job log compulsory acquisition unit 801 sends a job log sending request to the job log collection units 710, 723, and 724 of the client terminal apparatuses 101 and 102, the MFP 105, and the network printer 106b at the timing illustrated by the flow chart of FIG. 17. That is, the job log compulsory acquisition unit 801 sends a job log sending request in step S1201 whose processing is performed between steps S1122 (FIG. 15B) and S1123 (FIG. 15B), and step S1202 whose processing is performed between steps S1122 (FIG. 15B) and S1126 (FIG. 15B).

Referring to FIG. 17, if the request R which is sent from the client terminal apparatuses 101 and 102 includes a designation of a device, then the job log compulsory acquisition unit 801 sends a job log sending request to the designated device in step S1201. On the other hand, if no device has been designated in the request R that has been sent from the client terminal apparatuses 101 and 102, then the job log compulsory acquisition unit 801 sends a job log sending request to all job log collection units of the devices and the client terminals that the management server 104 manages (namely, to the job log collection unit of management-target devices/client terminals).

In the present exemplary embodiment, the job log compulsory acquisition unit 801 sends a job log sending request to the job log collection units 710, 723, and 724 of the client terminal apparatuses 101 and 102, the MFP 105, and the network printer 106b. The job log from each devices/client terminals is sent to the job log storage unit 715 of the management server 104, as in the case of the first exemplary embodiment, and the job log is to be processed in the same manner as in the first exemplary embodiment.

As described above, the present exemplary embodiment implements an acquisition unit by performing the processing in steps S1201 and S1202.

As described above, in the present exemplary embodiment, the management server 104 can acquire a latest job log from the device and the client terminal at a timing of receiving a charging destination change request. Thus, the present exemplary embodiment can achieve a similar effect to the first exemplary embodiment. Here, whether to perform the processing in step S1201 and step S1202 can be set differently as per device or system.

Third Exemplary Embodiment

A third exemplary embodiment of the present invention will be described below. In the present exemplary embodiment, the units and parts similar to the first and the second exemplary embodiments will not be described again.

The first and the second exemplary embodiments do not concern the matter related to data security. Accordingly, in the case of the first and the second exemplary embodiments, anyone can perform an operation for changing the charging destination for all jobs. In this regard, the present exemplary embodiment performs a user authentication (determination as to whether the user has an access authority) with an authentication server via the client terminal (the client terminal apparatuses 101 and 102) and determines whether the user can perform an operation for changing the charging destination via the client terminal based on authentication information.

For example, the present exemplary embodiment can perform a control such that with respect to a common user, the authentication server allows the user to perform the desired operation only when the owner of the desired job is the user himself or when the user is set as the charging destination to be changed by the charging destination change request. With respect to an administrator of the system, the present exemplary embodiment can perform a control such that the administrator can perform all desired operations.

Other Exemplary Embodiments

Each unit constituting the job log management system and each step of the job log management method according to the present exemplary embodiment can be implemented by executing the program stored on a storage unit such as a RAM or a ROM of a computer. The program and a computer-readable recording medium (storage medium) storing the program also constitute the present invention.

Moreover, the present invention can be implemented in a system, an apparatus, a method, a program, or a storage medium. That is, the present invention can be applied to a system including a plurality of devices and to an apparatus that includes one device.

The present invention can be implemented by directly or remotely supplying a program of software implementing functions of the above-described exemplary embodiments (in the exemplary embodiments, the program corresponding to the processing performed according to the flow charts in FIGS. 8, 12A, 12B, and 12C, 15A and 15B, and 17) to a system or an apparatus and reading and executing supplied program codes with the system or a computer of the apparatus.

Accordingly, the program code itself which is installed to a computer for implementing the functional processing of the present invention implements the present invention. That is, the present invention also includes the computer program implementing the functional processing of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk, an MO, a CD-ROM, a CD-R, a CD-RW, a magnetic tape, a nonvolatile memory card, a ROM, and a DVD (a DVD-ROM and a DVD-R), for example, can be used.

The program implementing the functions of the present invention can also be supplied by connecting to a web site on the Internet by using a browser of a client computer and by downloading the program from the web site to a recording medium such as a hard disk. In addition, the program implementing the functions of the present invention can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program files for implementing the functional processing configures the present invention.

In addition, the program implementing the functions of the present invention can also be supplied by distributing a storage medium such as a CD-ROM and the like which stores the program according to the present invention after an encryption thereof; by allowing the user who is qualified for a predetermined condition to download key information for decoding the encryption from the web site via the Internet; and by executing and installing in the computer the encrypted program code by using the key information.

In addition, the functions according to the exemplary embodiments described above can be implemented not only by executing the program code read by the computer but also by processing in which an OS or the like carries out a part of or the whole of the actual processing based on instructions given by the program code.

Further, program code read from recording medium can be written in a memory provided in a function expansion board inserted in a computer or a function expansion unit connected to the computer, and a CPU and the like provided in the function expansion board or the function expansion unit carries out a part of or the whole of the processing to implement the functions of the embodiments described above.

Each of the above-described exemplary embodiments is a mere example of an embodiment of the present invention, and is not intended to limit the technical scope of the present invention. That is, the present invention can be implemented in any form within the scope of its technical idea and essential features.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-155596 filed Jun. 12, 2007, which is hereby incorporated by reference herein in its entirety.

What is claimed is:

1. A job log management system configured to manage a job log in a database, generated according to processing of a job by a device, the job log management system comprising:
   a search unit configured, when a user designates a search condition for searching for the job log whose content is desired to be changed and issues a change request of the job log, to search the database for a job log that satisfies the search condition;
   a second acquisition unit configured to acquire a scheduled date and time for acquiring a subsequent job log with respect to one or more devices managed by the job log management system;
   a re-search unit configured, if the job log that satisfies the search condition is not extracted by the search unit, to wait until the database managing the job log is updated and then perform a re-search for the job log that satisfies the search condition without receiving an instruction for re-searching for the job log from the user;
   a changing unit configured, when the job log that satisfies the search condition is extracted by the re-search unit, to change a content of the job log according to the change request issued by the user; and
   a notification unit configured to send notification information about a result of the change performed by the changing unit,
   wherein the search unit, when the user designates the search condition for searching for the job log whose content is desired to be changed and the content of the change to the job log and issues the job log change request, searches the database for the job log that satisfies the search condition,
   wherein the changing unit, when the job log that satisfies the search condition is extracted, changes the content of the job log according to the designated content of the change,
   wherein the re-search unit waits until the scheduled date and time acquired by the second acquisition unit elapses,
   wherein the search unit, the second acquisition unit, the re-search unit, the changing unit, and the notification unit are implemented using one or more processors.

2. The job log management system according to claim 1, further comprising:
   a determination unit configured to determine whether the user has an access authority to access the job log whose content is desired to be changed,
   wherein the search unit searches for the job log that satisfies the search condition if the determination unit determines that the user has the access authority.

3. The job log management system according to claim 1, further comprising:
   a display unit configured to display extracted job logs on a display portion; and
   a receiving unit configured to receive the job log whose content is to be changed from among job logs displayed on the display unit according to an operation by the user,
   wherein the changing unit changes the content of the job log received by the receiving unit.

4. The job log management system according to claim 3,
   wherein the receiving unit receives the job log whose content is to be changed from among the job logs displayed on the display unit and receives the content of the change applied to the job log, and
   wherein the changing unit changes the content of the job log received by the receiving unit according to the content of the change received by the receiving unit.

5. The job log management system according to claim 3, further comprising:
   a second receiving unit configured to receive information indicating whether it is necessary for the user to verify the content of the change before applying the change to the selected job log, at a time the user issues the job log change request,
   wherein the display unit, when the second receiving unit receives the information indicating that it is necessary for the user to verify the content of the change before applying the change to the selected job log, displays the extracted job logs on the display portion.

6. The job log management system according to claim 1, further comprising:
   an acquisition unit configured to acquire a job log from the device when the job log that satisfies the search condition is not extracted,
   wherein the re-search unit re-searches for the job log that satisfies the search condition from among the job logs that the acquisition unit has acquired.

7. The job log management system according to claim 1,
   wherein the second acquisition unit acquires a scheduled date and time for acquiring a subsequent job log with respect to all devices managed by the job log management system,
   wherein the job log change request includes device information for identifying the device that has processed the job corresponding to the job log whose content is desired to be changed, and
   wherein the re-search unit waits until the date and time for acquiring the subsequent job log elapses, which is acquired by the second acquisition unit with respect to the device identified by the device information included in the job log change request.

8. The job log management system according to claim 1,
   wherein the second acquisition unit acquires a scheduled date and time for acquiring a subsequent job log with respect to all devices managed by the job log management system,
   wherein the re-search unit waits until a latest date and time among the dates and times acquired by the second acquisition unit elapses.

9. The job log management system according to claim 1, further comprising:
- a setting unit configured, if the job log that satisfies the search condition is not extracted, to set information about whether to keep waiting until a predetermined condition is satisfied or to acquire a job log from the device,
- wherein the re-search unit re-searches for the job log that satisfies the search condition according to a setting set by the setting unit.

10. The job log management system according to claim 1, further comprising:
- a third acquisition unit configured to acquire a latest job log acquisition date and time with respect to all devices managed by the job log management system; and
- a second determination unit configured to determine whether the job log whose content is desired to be changed has been received based on a result of comparing the date and time acquired by the third acquisition unit with respect to the device identified by the device information with a time at which the job corresponding to the job log whose content is to be changed has been performed,
- wherein the job log change request includes the device information for identifying the device that has processed the job corresponding to the job log whose content is desired to be changed and information indicating the time at which the job corresponding to the job log whose content is desired to be changed has been performed,
- wherein the search unit does not perform a search if the second determination determines that the job log whose content is desired to be changed has not been received, and
- wherein the notification unit, if the search unit does not perform the search, notifies that the job log whose content is desired to be changed is not searched for.

11. A method for managing a job log in a database, generated according to processing of a job by a device, the method comprising:
- searching the database for a job log that satisfies a search condition when a user designates the search condition for searching for the job log whose content is desired to be changed and issues a change request of the job log;
- acquiring a scheduled date and time for acquiring a subsequent job log with respect to one or more devices;
- performing a re-search for the job log that satisfies the search condition without receiving an instruction for re-searching for the job log from the user, after waiting until the database managing the job log is updated if the job log that satisfies the search condition is not extracted;
- changing a content of the job log when the job log that satisfies the search condition is extracted; and
- sending notification information about a result of the change applied to the job log,
- wherein the searching step comprises, when the user designates the search condition for searching for the job log whose content is desired to be changed and the content of the change to the job log and issues the job log change request, searching the database for the job log that satisfies the search condition,
- wherein the changing step comprises, when the job log that satisfies the search condition is extracted, changing the content of the job log according to the designated content of the change,
- wherein the performing the re-search step comprises performing the re-search after waiting until the scheduled date and time acquired in the acquiring step elapses.

12. A management server configured to manage a job log generated according to processing of a job by a device connected to the management server via a network progresses, the management server comprising:
- a database configured to store the job log acquired from the device;
- a search unit configured, when a user designates a search condition for searching for the job log whose content is desired to be changed and issues a change request of the job log, to search the database for a job log that satisfies the search condition;
- a second acquisition unit configured to acquire a scheduled date and time for acquiring a subsequent job log with respect to one or more devices managed by the management server;
- a re-search unit configured, if the job log that satisfies the search condition is not extracted by the search unit, to wait until the database managing the job log is updated and then perform a re-search for the job log that satisfies the search condition without receiving an instruction for re-searching for the job log from the user;
- a changing unit configured, when the job log that satisfies the search condition is extracted by the re-search unit, to change a content of the job log according to the change request issued by the user; and
- a sending unit configured to send information about a result of the change performed by the changing unit to a client terminal apparatus to notify the user of the change result information,
- wherein the search unit, when the user designates the search condition for searching for the job log whose content is desired to be changed and the content of the change to the job log and issues the job log change request, searches the database for the job log that satisfies the search condition,
- wherein the changing unit, when the job log that satisfies the search condition is extracted, changes the content of the job log according to the designated content of the change,
- wherein the re-search unit waits until the scheduled date and time acquired by the second acquisition unit elapses.

13. A method in a management server having a database configured to store a job log generated according to processing of a job by a device connected to the management server via a network, the method comprising:
- searching the database for a job log that satisfies a search condition when a user designates the search condition for searching for the job log whose content is desired to be changed and issues a change request of the job log;
- acquiring a scheduled date and time for acquiring a subsequent job log with respect to one or more devices managed by the management server;
- performing a re-search for the job log that satisfies the search condition without receiving an instruction for re-searching for the job log from the user, after waiting until the database managing the job log is updated if the job log that satisfies the search condition is not extracted;
- changing a content of the job log based on the change request when the job log that satisfies the search condition is extracted; and
- sending information about a result of the change applied to the job log to a client terminal apparatus to notify the user of the change result information,
- wherein the searching step comprises, when the user designates the search condition for searching for the job log whose content is desired to be changed and the content of the change to the job log and issues the job log change request, searching the database for the job log that satisfies the search condition, wherein the changing step comprises, when the job log that satisfies the search condition is extracted, changing the content of the job log according to the designated content of the change, wherein the performing the re-search step comprises performing the re-search after waiting until the scheduled date and time acquired in the acquiring step elapses.

14. A computer-readable storage medium storing instructions which cause a computer to perform a method in a management server having a database configured to store a job log generated according to processing of a job by a device connected to the management server via a network, the method comprising:

searching the database for a job log that satisfies a search condition when a user designates the search condition for searching for the job log whose content is desired to be changed and issues a change request of the job log;

acquiring a scheduled date and time for acquiring a subsequent job log with respect to one or more devices managed by the management server;

performing a re-search for the job log that satisfies the search condition without receiving an instruction for re-searching for the job log from the user, after waiting until the database managing the job log is updated if the job log that satisfies the search condition is not extracted;

changing a content of the job log based on the change request when the job log that satisfies the search condition is extracted; and sending information about a result of the change applied to the job log to a client terminal apparatus to notify the user of the change result information, wherein the searching step comprises, when the user designates the search condition for searching for the job log whose content is desired to be changed and the content of the change to the job log and issues the job log change request, searching the database for the job log that satisfies the search condition, wherein the changing step comprises, when the job log that satisfies the search condition is extracted, changing the content of the job log according to the designated content of the change, wherein the performing the re-search step comprises performing the re-search after waiting until the scheduled date and time acquired in the acquiring step elapses.

15. A job log management system configured to manage a job log in a database, generated according to processing of a job by a device, the job log management system comprising:

a search unit configured, when a user designates a search condition for searching for the job log whose content is desired to be changed and issues a change request of the job log, to search the database for a job log that satisfies the search condition;

a re-search unit configured, if the job log that satisfies the search condition is not extracted by the search unit, to wait until the database managing the job log is updated and then perform a re-search for the job log that satisfies the search condition without receiving an instruction for re-searching for the job log from the user;

a changing unit configured, when the job log that satisfies the search condition is extracted by the re-search unit, to change a content of the job log according to the change request issued by the user;

a notification unit configured to send notification information about a result of the change performed by the changing unit;

a third acquisition unit configured to acquire a latest job log acquisition date and time with respect to all devices managed by the job log management system; and a second determination unit configured to determine whether the job log whose content is desired to be changed has been received based on a result of comparing the date and time acquired by the third acquisition unit with respect to the device identified by the device information with a time at which the job corresponding to the job log whose content is to be changed has been performed, wherein the job log change request includes the device information for identifying the device that has processed the job corresponding to the job log whose content is desired to be changed and information indicating the time at which the job corresponding to the job log whose content is desired to be changed has been performed, wherein the search unit does not perform a search if the second determination determines that the job log whose content is desired to be changed has not been received, and wherein the notification unit, if the search unit does not perform the search, notifies that the job log whose content is desired to be changed is not searched for, wherein the search unit, the re-search unit, the changing unit, the notification unit, the third acquisition unit, and the second determination unit are implemented using one or more processors.

* * * * *